United States Patent
Mizutani et al.

(10) Patent No.: US 10,536,244 B2
(45) Date of Patent: Jan. 14, 2020

(54) COMMUNICATION DEVICE AND COMMUNICATION SYSTEM FOR HANDLING COMMUNICATION ERROR OF SUPERIMPOSED SIGNAL

(71) Applicant: OMRON Corporation, Kyoto (JP)

(72) Inventors: Seiji Mizutani, Moriyama (JP); Hideki Harada, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/892,338

(22) Filed: Feb. 8, 2018

(65) Prior Publication Data

US 2018/0343092 A1 Nov. 29, 2018

(30) Foreign Application Priority Data

May 23, 2017 (JP) ................................ 2017-101655

(51) Int. Cl.
*H04W 72/04* (2009.01)
*H04L 5/00* (2006.01)
(Continued)

(52) U.S. Cl.
CPC ........ *H04L 5/0044* (2013.01); *G05B 19/0425* (2013.01); *G05B 19/058* (2013.01);
(Continued)

(58) Field of Classification Search
None
See application file for complete search history.

(56) References Cited

U.S. PATENT DOCUMENTS 9,582,349 B1 * 2/2017 Schmit ............... G06F 11/0763
2002/0171761 A1 * 11/2002 Suzuki .................. H04N 7/083
348/484

(Continued)

FOREIGN PATENT DOCUMENTS

DE   102011086054   5/2013
EP       1857938    11/2007
WO     2010118879   10/2010

OTHER PUBLICATIONS

IO-Link Community, "10-Link Interface and System Specification", version 1.1.2, 4 Overview of SDCI, Order No: 10.002, Jul. 2013, pp. 32-37.

(Continued)

*Primary Examiner* — Sithu Ko
(74) *Attorney, Agent, or Firm* — JCIPRNET

(57) ABSTRACT

Provided is a highly convenient communication device capable of detecting a communication error caused by an abnormality of a state of communication. A communication device capable of mutually communicating with an electrical device includes: a superimposed signal receiving unit that periodically receives a data signal related to the electrical device as a signal superimposed on an operation signal; a period determination unit that determines whether or not a communication error of the data signal detected by the superimposed signal receiving unit is able to be regarded as having occurred in a transition period of a value of the operation signal; and a state determination unit that determines a state of communication with the electrical device in accordance with the determination by the period determination unit.

8 Claims, 11 Drawing Sheets

(51) Int. Cl.
*H04L 1/00* (2006.01)
*G05B 19/042* (2006.01)
*G05B 19/05* (2006.01)
*G05B 19/418* (2006.01)

(52) U.S. Cl.
CPC ........ *G05B 19/4184* (2013.01); *H04L 1/0023* (2013.01); *G05B 2219/14037* (2013.01); *G05B 2219/14047* (2013.01); *G05B 2219/24033* (2013.01); *G05B 2219/25153* (2013.01); *G05B 2219/25428* (2013.01); *G05B 2219/33331* (2013.01)

(56) References Cited

U.S. PATENT DOCUMENTS

| | | | | |
|---|---|---|---|---|
| 2003/0032392 | A1* | 2/2003 | Suzuki | H04N 7/083 455/39 |
| 2010/0254407 | A1* | 10/2010 | Tanaka | H04J 3/1694 370/468 |
| 2013/0201976 | A1* | 8/2013 | Sugiyama | H04W 72/0446 370/336 |

OTHER PUBLICATIONS

"Search Report of Europe Counterpart Application", dated Oct. 11, 2018, p. 1-p. 5.

\* cited by examiner

COMMUNICATION DEVICE AND COMMUNICATION SYSTEM FOR HANDLING COMMUNICATION ERROR OF SUPERIMPOSED SIGNAL

CROSS-REFERENCE TO RELATED APPLICATION

This application claims the priority of Japan patent application serial no. 2017-101655, filed on May 23, 2017. The entirety of the above-mentioned patent application is hereby incorporated by reference herein and made a part of this specification.

BACKGROUND

Technical Field

The disclosure relates to a communication device that receives a data signal received from an electrical device as a signal superimposed on an operation signal for controlling operations of the electrical device.

Description of Related Art

In the related art, there is a three-line-type electrical device (sensor or the like) that transmits and receives communication data in addition to detection information. Such an electrical device requires at least two power source lines and one signal line to supply power and input and output signals. IO-Link (registered trademark) is one three-line-type communication method. Non-Patent Document 1 is a specification of IO-Link.

[Non-Patent Document 1] "IO-Link Interface and System Specification", version 1.1.2, July 2013, IO-Link Community, Order No: 10.002, 4 Overview of SDCI, p. 32 to p. 37

However, the technique of Non-Patent Document 1 has a problem that the number of wirings increases. In addition, in the technique of Non-Patent Document 1, the sensor converts the detection signal of the sensor into communication data and then transmits the communication data. Therefore, there is a problem that it takes a long time for the external device to recognize the detection signal due to conversion processing and a communication delay time or that circuit configurations of the sensor and the external device become complicated.

In order to address the aforementioned problem, the inventor of the disclosure has newly developed a communication device that receives a data signal received from a sensor as a signal superimposed on an operation signal output from the sensor or an operation signal input to the sensor. However, a communication method used by such a communication device and the sensor is different from a communication method in the related art, and variations in voltages input to or output from the sensor affect the communication. If variations in input and output voltages occur due to switching of a switch that the sensor has, for example, a value of the operation signal transits. The communication device detects a communication error in a transition period of a value of the operation signal. That is, in a case in which the sensor performs state transition by causing its own input and output voltages to vary, the communication device detects a communication error even if the state transition is a normal operation. At this time, the communication device that communicates with the electrical device by using the superimposed signal has difficulty distinguishing the communication error detected during the transition period of the electrical device from a communication error due to disconnection of a wiring, a communication error due to an influence of disturbance noise, or the like.

An aspect of the disclosure is to solve the aforementioned problem and is to provide a highly convenient communication device capable of detecting a communication error caused by an abnormality of a state of communication in the communication device that communicates with an electrical device.

SUMMARY

A communication device according to an embodiment of the disclosure is a communication device capable of mutually communicating with an electrical device, the communication device including: a superimposed signal receiving unit that receives a data signal related to the electrical device as a signal superimposed on an operation signal output from the electrical device or an operation signal input to the electrical device; a period determination unit that determines whether or not a communication error of the data signal detected by the superimposed signal receiving unit is able to be regarded as having occurred in a transition period of a value of the operation signal; and a state determination unit that determines a state of communication with the electrical device in accordance with the determination by the period determination unit.

A communication system according to an embodiment of the disclosure includes an electrical device; and the communication device that receives a data signal related to the electrical device as a signal superimposed on an operation signal output from the electrical device or an operation signal input to the electrical device, and a state of communication with the electrical device is determined in accordance with whether or not a communication error of the data signal detected by the communication device is able to be regarded as having occurred in a transition period of a value of the operation signal.

DESCRIPTION OF THE EMBODIMENTS

Figure 1:
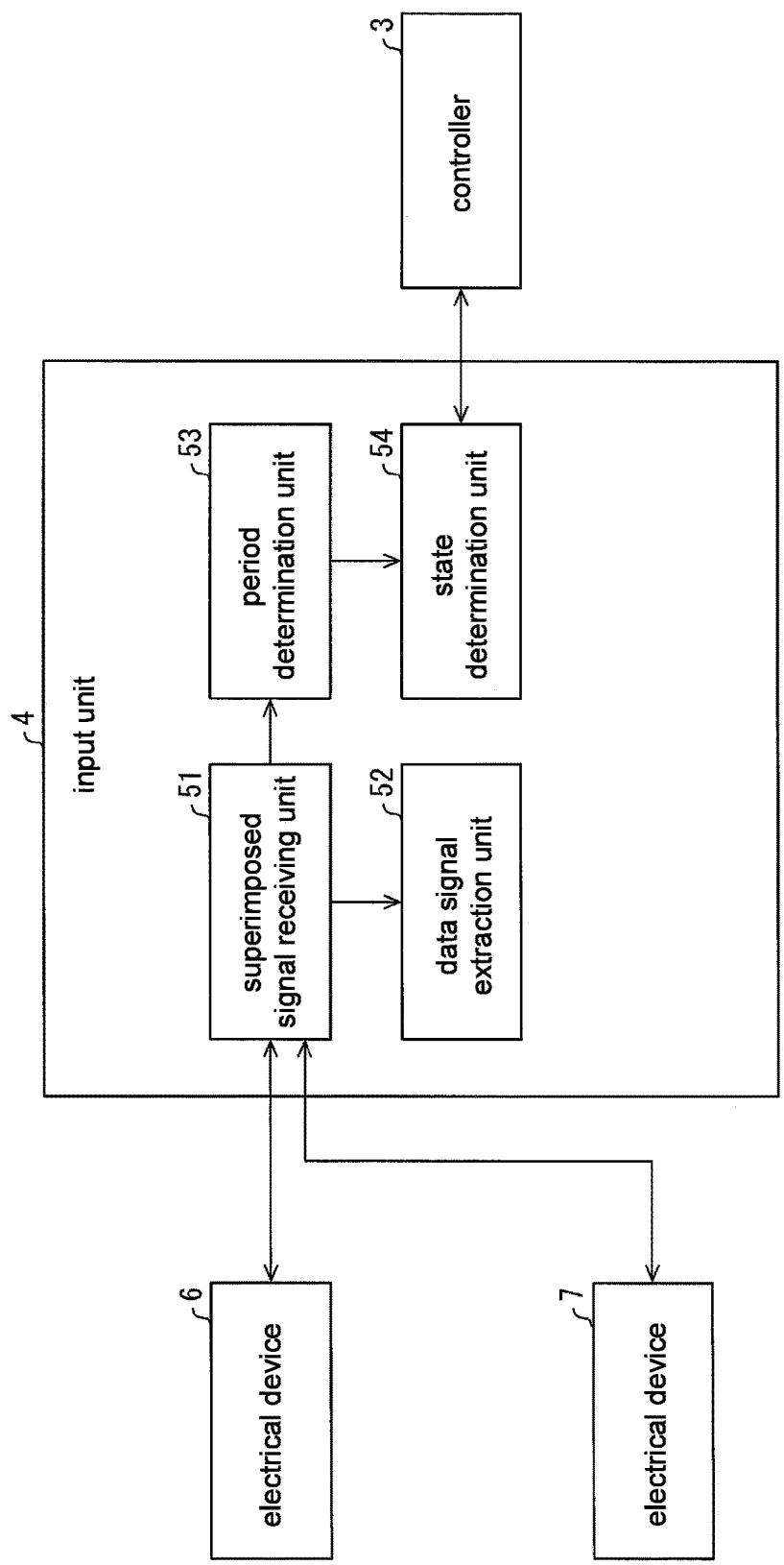
FIG. 1 is a block diagram illustrating an outline of configurations of main parts in a communication device according to an embodiment of the disclosure.

In the communication device according to an embodiment of the disclosure, the period determination unit may determine whether or not the communication error is able to be regarded as having occurred in the transition period in accordance with a continuation time that the communication error is successively detected.

In the communication device according to an embodiment of the disclosure, the period determination unit may regard the communication error as having occurred in the transition period in a case in which the continuation time is within a first predetermined threshold value, and the state determination unit may determine that no problem has occurred in the state of communication with the electrical device in a case in which the period determination unit regards the communication error as having occurred in the transition period.

In the communication device according to an embodiment of the disclosure, the period determination unit may regard the communication error as having occurred in a period other than the transition period in a case in which the continuation time is greater than the first threshold value, and the state determination unit may determine that there is a possibility that a problem has occurred in the state of the communication with the electrical device in a case in which the period determination unit regards the communication error as having occurred in a period other than the transition period.

In the communication device according to an embodiment of the disclosure, the state determination unit may determine that a problem has occurred in the state of the communication with the electrical device in a case in which the continuation time is greater than a second threshold value that is greater than the first threshold value.

The communication device according to an embodiment of the disclosure may further include a transition period start detection unit that detects a start of the transition period, the period determination unit may regard a predetermined period from the start of the transition period as the transition period and determine whether or not the communication error is able to be regarded as having occurred in the transition period, and the state determination unit may determine that no problem has occurred in the state of the communication with the electrical device in a case in which the period determination unit regards the communication error as having occurred in the transition period.

In the communication device according to an embodiment of the disclosure, the state determination unit may determine the state of the communication with the electrical device in accordance with a continuation time or a number of times that the communication error is successively detected in a case in which the period determination unit regards the communication error as having occurred in a period other than the transition period.

The communication device according to an embodiment of the disclosure may further include an error rate calculation unit that calculates occurrence probability of the communication error in a period that is determined by the period determination unit as the period other than the transition period.

The communication device according to an embodiment of the disclosure may further include an error control unit that detects an error of the data signal, the superimposed signal receiving unit may successively receive the same data signals a plurality of times from the electrical device, and the error control unit may determine that the data signals are normally received data signals in a case in which the data signals successively received the plurality of times coincide with each other.

According to an embodiment of the disclosure, an effect that it is possible to provide a highly convenient communication device capable of detecting a communication error caused by an abnormality of a state of communication in the communication device that communicates with an electrical device by using a superimposed signal is achieved.

First Embodiment

A first embodiment of the invention will be described below with reference to FIGS. 1 to 7. Note that an input unit 4 and an output unit 5 correspond to communication devices in the embodiment. In addition, although the following description relates to communication between the input unit 4 and electrical devices 6 and 7, the same is true for communication between the output unit 5 and electrical devices 8 to 10.

(Configuration of Input Unit)

FIG. 1 is a block diagram illustrating an example of configurations of main parts in the input unit 4 that is the communication device according to the embodiment. The input unit 4 includes a superimposed signal receiving unit 51, a data signal extraction unit 52, a period determination unit 53, and a state determination unit 54.

Figure 3:
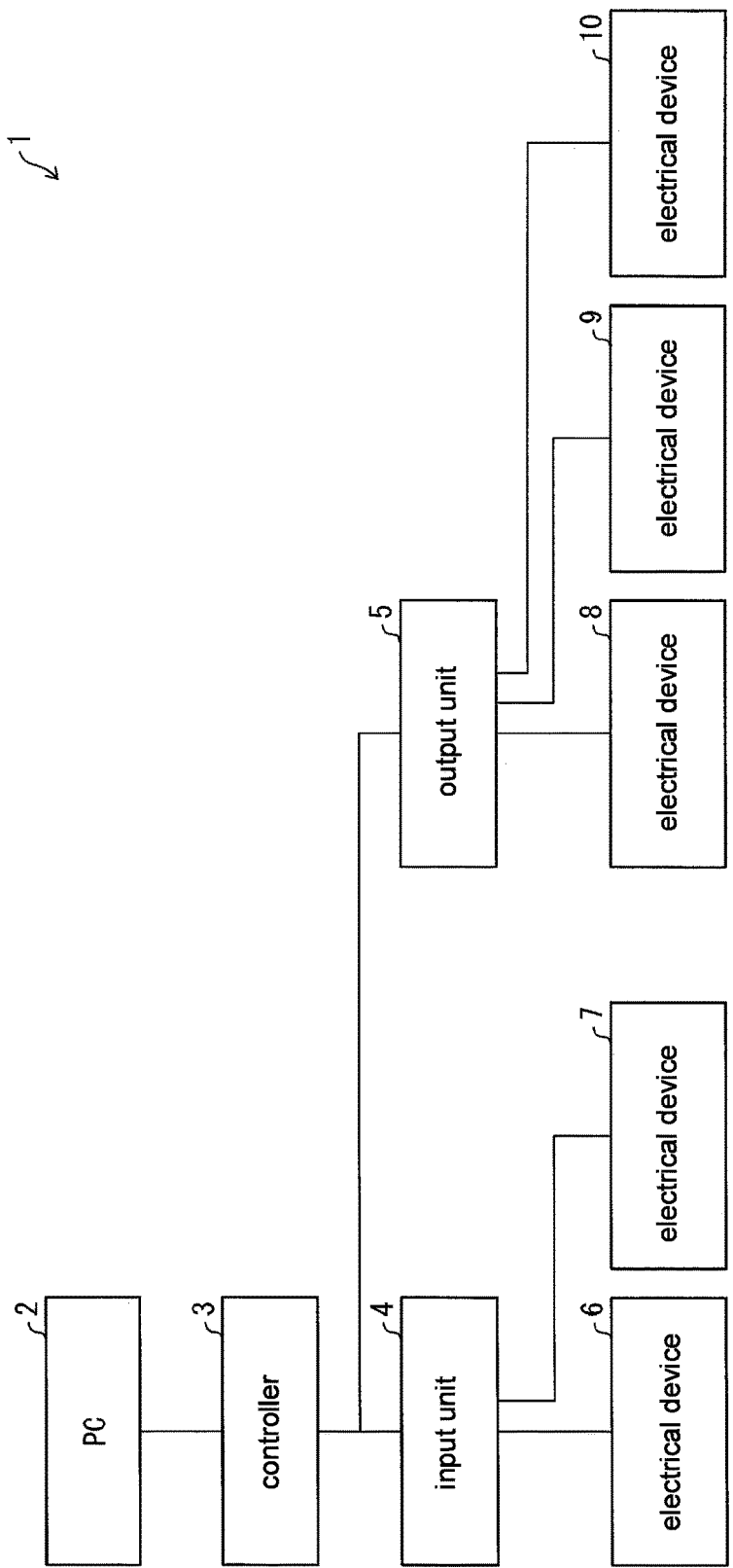
FIG. 3 is a block diagram illustrating a configuration of a control system according to an embodiment of the disclosure.

The input unit 4 is a reception device, is connected to a plurality of electrical devices to be able to mutually communicate with them, and can receive superimposed signals from the respective electrical devices. Here, the superimposed signals are signals obtained by superimposing data signals related to the electrical devices on operation signals output from the electrical devices. In the example illustrated in the drawing, the electrical devices 6 and 7 are both connected to the input unit 4. That is, the input unit 4 can receive superimposed signals from the electrical devices 6 and 7. In the embodiment, the input unit 4 periodically receives the data signals included in the superimposed signals from the electrical devices 6 and 7. Note that the data signals are not necessarily received periodically. The connection between the input unit and the electrical devices 6 and 7 is established by a pair of signal lines, for example. In addition, the input unit 4 can extract a data signal from a received superimposed signal, determine a state of communication between an electrical device that is a transmission source of the superimposed signal and the input unit 4 itself, and output the result to a controller 3. The input unit 4 may be included in a communication system 1 as illustrated in FIG. 3 along with a plurality of devices including the electrical devices 6 and 7 and the controller 3. Details of the electrical devices 6 and 7, the controller 3, and the communication system 1 will be described later.

The input unit 4 can determine whether or not a communication error in communication with the electrical devices 6 and 7 is able to be regarded as having occurred in a transition period of values of operation signals of the electrical devices 6 and 7 when the communication error is detected in a state of the communication with the electrical devices 6 and 7. Note that communication errors detected in a period other than the transition period include a communication error caused by repetition of instantaneous disconnection when a contact point of a switch is in an unstable state, a communication error caused by disturbance noise, disconnection of a wiring, and the like.

The superimposed signal receiving unit 51 can receive the superimposed signals from the electrical devices connected to the input unit 4. The superimposed signal receiving unit 51 can transmit the received superimposed signals to the data signal extraction unit 52. If the superimposed signal receiving unit 51 detects that a communication error related to a data signal has occurred in communication with an electrical device, then the superimposed signal receiving unit 51 transmits a signal indicating that the communication error has occurred to the period determination unit 53.

The data signal extraction unit 52 extracts data signals from the superimposed signals received from the superimposed signal receiving unit 51. The input unit 4 can execute processing in accordance with the extracted data signals.

The period determination unit 53 can determine whether or not the communication error detected by the superimposed signal receiving unit 51 is able to be regarded as having occurred in transition periods of values of the operation signals of the electrical devices 6 and 7. More specifically, the period determination unit 53 can determine whether or not a series of communication errors are able to be regarded as having occurred in the transition periods of the electrical devices 6 and 7 in accordance with a continuation time during which the superimposed signal receiving unit 51 successively detects the communication errors. The period determination unit 53 can transmit the determination result to the state determination unit 54.

The period determination unit 53 may determine whether or not the communication error is able to be regarded as having occurred in the transition period in accordance with the continuation time during which the superimposed signal receiving unit 51 successively detects the communication error (communication error detection continuation time), for example. More specifically, the period determination unit 53 may regard the communication error as having occurred in the transition period when the continuation time during which the communication error is detected is within a first predetermined threshold value. In contrast, when the continuation time is greater than the first predetermined threshold value, the period determination unit 53 may regard the communication error as having occurred in a period other than the transition period. Here, the first predetermined threshold value may be set by any method. For example, the first predetermined threshold value may be manually set by a user, or a large value that is estimated to sufficiently include the transition period may be set in advance. Alternatively, a value of a transition period of a product with the longest transition period in a product lineup including the electrical devices 6 and 7 may be applied.

The state determination unit 54 can determine a state of communication between the input unit 4 and the electrical devices 6 and 7 in accordance with the determination result received from the period determination unit 53. An example of a method of determining the state of communication between the input unit 4 and the electrical devices 6 and 7 by the state determination unit 54 will be described later in detail.

(Circuit Configurations of Input Unit and Electrical Device)

Figure 2:
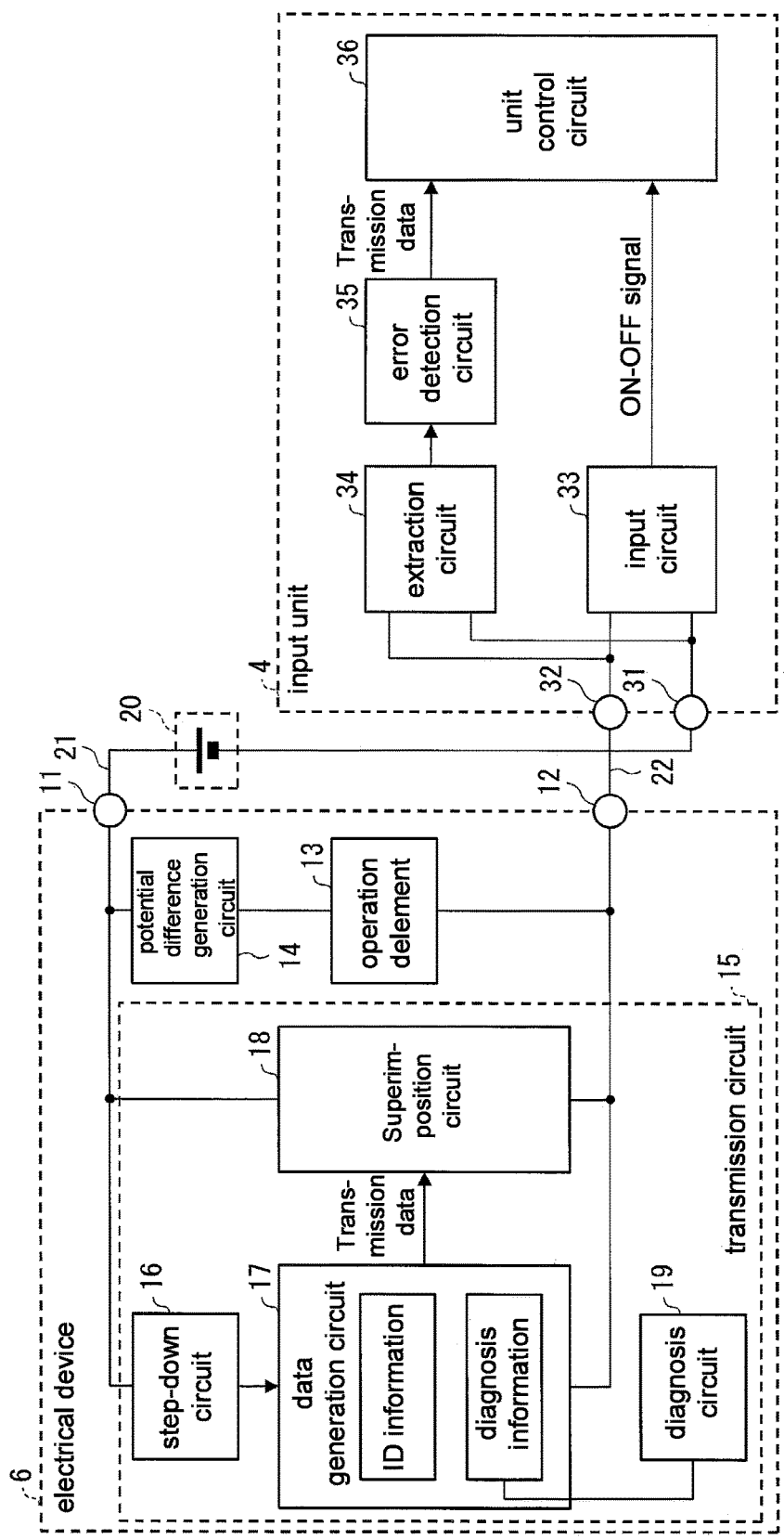
FIG. 2 is a block diagram illustrating circuit configurations of an input unit that is a communication device, and an electrical device according to an embodiment of the disclosure.

FIG. 2 is a block diagram illustrating circuit configurations of the electrical device 6 and the input unit 4. The electrical device 6 (limit switch) and the input unit 4 will be given as examples in this description. The electrical device 6 and the input unit 4 are connected to each other by a pair of signal lines 21 and 22. The signal line 21 is connected to a first input terminal 31 of the input unit 4 and a first terminal 11 of the electrical device 6. The signal line 22 is connected to a second input terminal 32 of the input unit 4 and a second terminal 12 of the electrical device 6. A power source 20 is provided in a route of the signal line 21. The power source 20 is a direct current power source that generates a predetermined voltage (24 V in this case).

The electrical device 6 includes a first terminal 11, a second terminal 12, an operation element 13, a potential difference generation circuit 14, and a transmission circuit 15. The transmission circuit 15 includes a step-down circuit 16, a data generation circuit 17, a superimposition circuit 18, and a diagnosis circuit 19. The operation element 13 is connected between the first terminal 11 and the second terminal 12. The potential difference generation circuit 14 is connected to the operation element 13 in series in an electric conducting path between the first terminal 11 and the second terminal 12. The potential of the second terminal 12 changes in accordance with a state of the operation element 13. That is, the second terminal 12 outputs an output signal (operation signal) in accordance with the state of the operation element 13 to the outside (signal line 22).

The transmission circuit 15 is connected between the first terminal 11 and the second terminal 12. The transmission circuit 15 operates by using a voltage between the first terminal 11 and the second terminal 12 as a power source. The step-down circuit 16 lowers the voltage between the first terminal 11 and the second terminal 12 to a predetermined voltage and outputs the predetermined voltage to the data generation circuit 17. The data generation circuit 17 operates by the voltage applied from the step-down circuit 16 and generate transmission data to be transmitted to the input unit 4. The transmission data includes an identifier (ID information) unique to the electrical device 6, for example. The data generation circuit 17 outputs the transmission data to the superimposition circuit 18. The superimposition circuit 18 superimposes the received transmission data as a data signal on the output signal. In this manner, the transmission circuit 15 outputs the superimposed signal obtained by superimposing the data signal on the output signal from the second terminal 12 to the signal line 22.

The diagnosis circuit 19 operates by a voltage applied from the step-down circuit 16 and generates diagnosis data that represents diagnosis information of the electrical device 6. The diagnosis circuit 19 includes a checking circuit related to an element (for example, the operation element 13) of the electrical device 6 and generates the diagnosis data indicating whether or not the electrical device 6 works normally in accordance with whether or not an output from the checking circuit is normal. The diagnosis circuit 19 outputs the diagnosis data (diagnosis information) to the data generation circuit 17. The data generation circuit 17 may include the diagnosis data in transmission data.

The input unit 4 includes a first input terminal 31, a second input terminal 32, an input circuit 33, an extraction circuit 34, an error detection circuit 35, and a unit control circuit 36. In FIG. 1, illustration of a configuration of a portion for transmission to the controller 3 is omitted. The potential of the first input terminal 31 is constantly maintained (for example, GND). The superimposed signal is input from the signal line 22 to the second input terminal 32.

The input circuit 33 corresponds to the superimposed signal receiving unit 51 in FIG. 1, extracts the output signal from the superimposed signal, and outputs the output signal to the unit control circuit 36. The extraction circuit 34 corresponds to the data signal extraction unit 52 in FIG. 1, extracts the data signal from the superimposed signal, and outputs the data signal to the error detection circuit 35. The error detection circuit 35 performs error detection on the data signal by using an arbitrary data checking method such as CRC checking (cyclic redundancy check) or Manchester code checking. The error detection circuit 35 outputs the data signal and the error detection result to the unit control circuit 36. Note that the error detection circuit 35 outputs a notification of the error detection, and the unit control circuit 36 discards the data signal in a case in which an error has been detected in the data signal. In addition, the error detection circuit 35 may output the notification of the error detection without outputting the data signal to the unit control circuit 36 in a case in which an error has been detected in the data signal. The unit control circuit 36 corresponds to the period determination unit 53 and the state determination unit 54 in FIG. 1 and outputs the output signal and the data signal to the controller 3. The error detection circuit 35 and the unit control circuit 36 can be formed by a single integrated circuit or a plurality of integrated circuits, for example.

(Determination of State of Communication)

An example of determination of a state of communication between the input unit 4 and the electrical device 6, which is executed by the state determination unit 54, in an embodiment of the disclosure will be described below. Note that, although the combination between the input unit 4 and the electrical device 6 will be described below, any combination between the communication device and an electrical device according to an embodiment of the disclosure may be employed. For example, a combination between the input unit 4 and the electrical device 7 may be employed, or a combination between the output unit 5 and any of the electrical devices 8 to 10 may be employed.

The state determination unit 54 determines that no problem has occurred in the state of the communication between the input unit 4 and the electrical device 6 when the superimposed signal receiving unit 51 receives the data signal included in the superimposed signal normally, and can distinguish a cause of the detected communication error between a cause due to an abnormality of a wiring and a cause due to transmission in the transition period of the electrical device 6 on the basis of the determination result of the period determination unit 53 when the superimposed signal receiving unit 51 detects the communication error.

In addition, the state determination unit 54 can output the data signal to the outside when the superimposed signal receiving unit 51 receives the data signal included in the superimposed signal normally.

The state determination unit 54 determines that there is a possibility that a problem has occurred in a state of the communication between the input unit 4 and the electrical device 6 when the determination result received from the period determination unit 53 indicates that the communication error detected by the superimposed signal receiving unit 51 is regarded as having occurred in a period other than the transition period of the electrical device 6. At this time, the state determination unit 54 may output the fact that a predictive sign of disconnection has appeared in the state of the communication between the input unit 4 and the electrical device 6, for example, to the outside.

The state determination unit 54 determines that a problem has occurred in the state of the communication between the input unit 4 and the electrical device 6 in a case in which the determination result received from the period determination unit 53 indicates that the communication error detected by the superimposed signal receiving unit 51 is regarded as having occurred in the period other than the transition period of the electrical device 6 and the continuation time of the communication error is greater than a second threshold value that is greater than the first predetermined threshold value. Here, the second threshold value is a time that is sufficiently longer than the transition period of the electrical device 6 and may be 10 times as long as the transition period, for example. In addition, the second threshold value may be configured to be set as an initial value in advance and the user can appropriately update the second threshold in accordance with the configuration of the communication system 1 or the like. At this time, the state determination unit 54 may output the fact that disconnection has occurred in the state of the communication between the input unit 4 and the electrical device 6, for example, to the outside.

With the aforementioned configuration, the state determination unit 54 can determine the state of the communication between the input unit 4 and the electrical device 6 in accordance with the determination result of the period determination unit 53.

(Content of Determination Result)

An example of content of the determination result of the state of the communication between the input unit 4 and the electrical device 6, which is output by the state determination unit 54 to the outside, in an embodiment of the disclosure, will be described below.

The state determination unit 54 may output the fact that no problem has occurred in the state of the communication between the input unit 4 and the electrical device 6 when the communication between the input unit 4 and the electrical device 6 is performed normally. At this time, an identifier (ID) included in the data signal that has been extracted from the superimposed signal may be output as an identifier indicating the electrical device 6 with which normal communication has been performed. In addition, the state determination unit 54 may acquire information of the entire view of the communication system 1 created in advance by a CAD or the like and output position information indicating the position of the electrical device 6 with which normal communication has been performed.

(Configuration of Communication System 1)

An outline of the communication system using the input unit 4 according to an embodiment of the disclosure will be described below with reference to FIG. 3. FIG. 3 is a block diagram illustrating a configuration of the communication system according to the embodiment. The communication system 1 includes a PC 2 (a personal computer, an information processing device), the controller 3, the input unit 4, the output unit 5, and the electrical devices 6 to 10. The PC 2 is connected to the controller 3. The PC 2 receives information related to the electrical devices 6 to 10 from the controller 3 and transmits a control command to the controller 3. The controller 3 is connected to the input unit 4 and the output unit 5. The controller 3 transmits signals for operating or controlling the electrical devices 6 to 10 to the input unit 4 and the output unit 5 in accordance with the control command. The controller 3 transmits signals from the electrical devices 6 to 10 received via the input unit 4 or the output unit 5 to the PC 2.

The electrical devices 6 and 7 operate by electric power supplied from the input unit 4 and transmit signals in accordance with states of operation elements included in the electrical devices 6 and 7 to the input unit 4. Here, the electrical device 6 is a limit switch that includes a switch as the operation element. The electrical device 7 is a sensor that includes a sensing element as the operation element.

The output unit 5 (reception device) is connected to the electrical devices 8 to 10. Each of the respective electrical devices 8 to 10 is connected to the output unit 5 by a pair of signal lines. The output unit 5 operates the electrical devices 8 to 10 and controls the electrical devices 8 to 10 on the basis of instructions from the PC 2 and the controller 3. In addition, the output unit 5 transmits data signals received from the electrical devices 8 to 10 to the controller 3. The output unit 5 includes a configuration similar to that of the input unit 4 described above with reference to FIG. 1. That is, the output unit 5 includes the superimposed signal receiving unit 51, the data signal extraction unit 52, the period determination unit 53, and the state determination unit 54. The output unit 5 can receive superimposed signals from the electrical devices 8 to 10 and extract data signals from the received superimposed signals. Further, the output unit 5 can determine the state of the communication between the output unit 5 and the electrical devices in accordance with a result of determining whether or not a communication error detected by the superimposed signal receiving unit 51 is able to be regarded as having occurred in transition periods of values of the operation signals of the electrical devices 8 to 10. Then, the output unit 5 can output the determination result to the controller 3.

The electrical devices 8 to 10 operate by electric power supplied from the output unit 5 and are controlled by control signals received from the output unit 5. Here, the electrical device 8 is a relay device that includes a coil as the operation element. The electrical device 9 is an electromagnetic valve that includes a coil as the operation element. The electrical device 10 is an electric actuator that includes a coil as the operation element.

(Circuit Configurations of Output Unit and Electrical Device)

Figure 4:
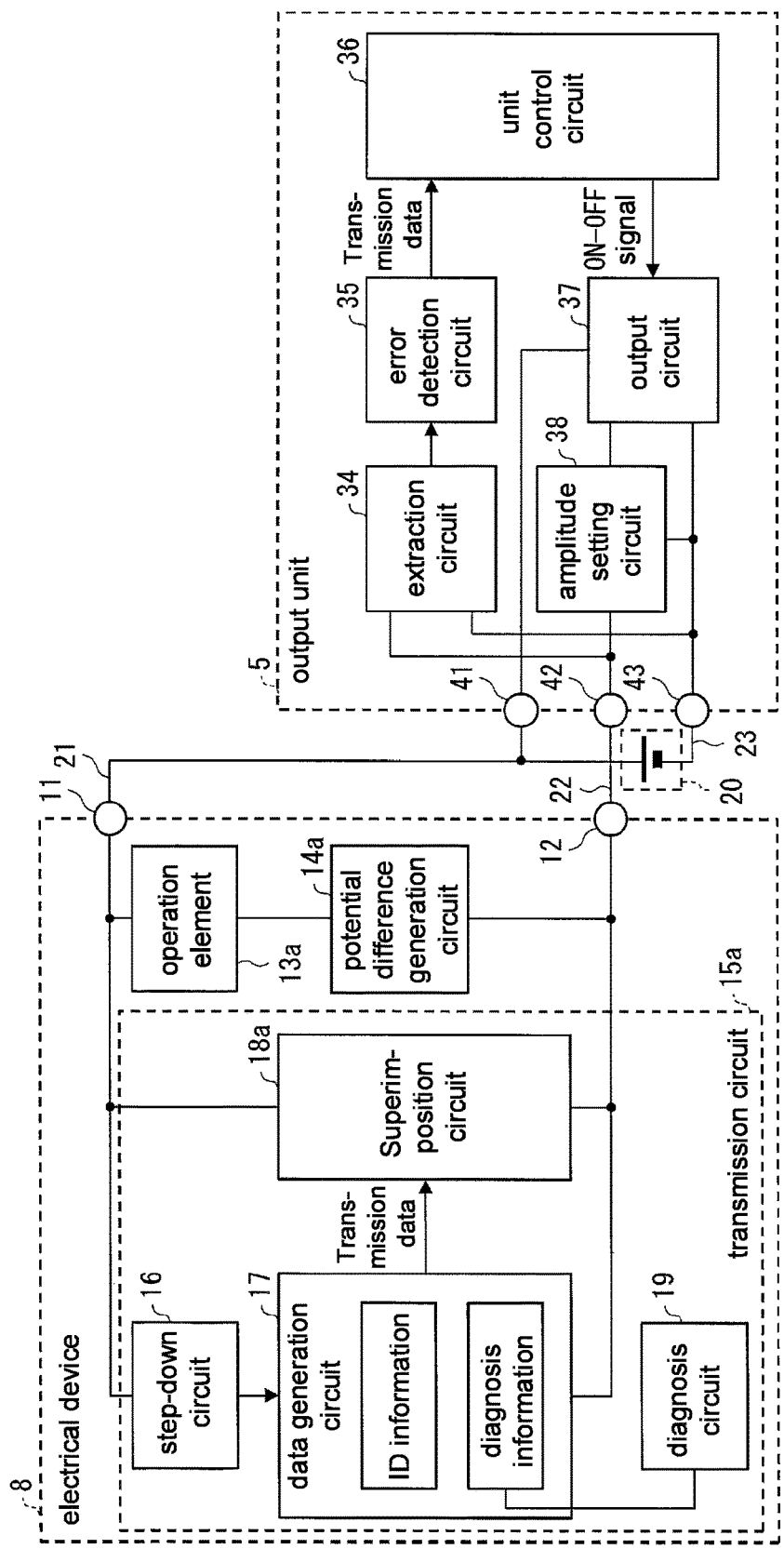
FIG. 4 is a block diagram illustrating circuit configurations of an output unit that is a communication device, and an electrical device according to an embodiment of the disclosure.

FIG. 4 is a block diagram illustrating circuit configurations of the electrical device 8 and the output unit 5. The electrical device 8 (relay) and the output unit 5 will be given as examples in this description. The electrical device 8 and the output unit 5 are connected to each other by a pair of signal lines 21 and 22. The signal line 21 is connected to a first output terminal 41 of the output unit 5 and the first terminal 11 of the electrical device 8. The signal line 22 is connected to a second output terminal 42 of the output unit 5 and a second terminal 12 of the electrical device 8. The first output terminal 41 and the third output terminal 43 of the output unit 5 are connected to each other by a signal line 23. A power source 20 is provided in a route of the signal line 23. The power source 20 is a direct current power source that generates a predetermined voltage (24 V in this case).

The electrical device 8 includes a first terminal 11, a second terminal 12, an operation element 13a, a potential difference generation circuit 14a, and a transmission circuit 15a. The transmission circuit 15a includes a step-down circuit 16, a data generation circuit 17, a superimposition circuit 18a, and a diagnosis circuit 19. The operation element 13a is connected between the first terminal 11 and the second terminal 12. The potential difference generation circuit 14a is connected to the operation element 13a in series in an electric conducting path between the first terminal 11 and the second terminal 12. The potential of the second terminal 12 changes in accordance with a control signal (operation signal) for controlling the operation element 13a. The control signal is input from the outside (output unit 5) to the second terminal 12.

The transmission circuit 15a is connected between the first terminal 11 and the second terminal 12. The transmission circuit 15a operates by using a voltage between the first terminal 11 and the second terminal 12 as a power source. The step-down circuit 16 lowers the voltage between the first terminal 11 and the second terminal 12 to a predetermined voltage and outputs the predetermined voltage to the data generation circuit 17. The data generation circuit 17 operates by a voltage applied from the step-down circuit 16 and generates transmission data to be transmitted to the output unit 5. The transmission data includes an identifier unique to the electrical device 8, for example. The data generation circuit 17 outputs the transmission data to the superimposition circuit 18a. The superimposition circuit 18a superimposes the received transmission data as a data signal on the control signal. In this manner, the transmission circuit 15a superimposes the data signal on the control signal and outputs the superimposed signal from the second terminal 12 to the signal line 22.

The diagnosis circuit 19 operates by a voltage applied from the step-down circuit 16 and generates diagnosis data representing diagnosis information of the electrical device 8.

Figure 10:
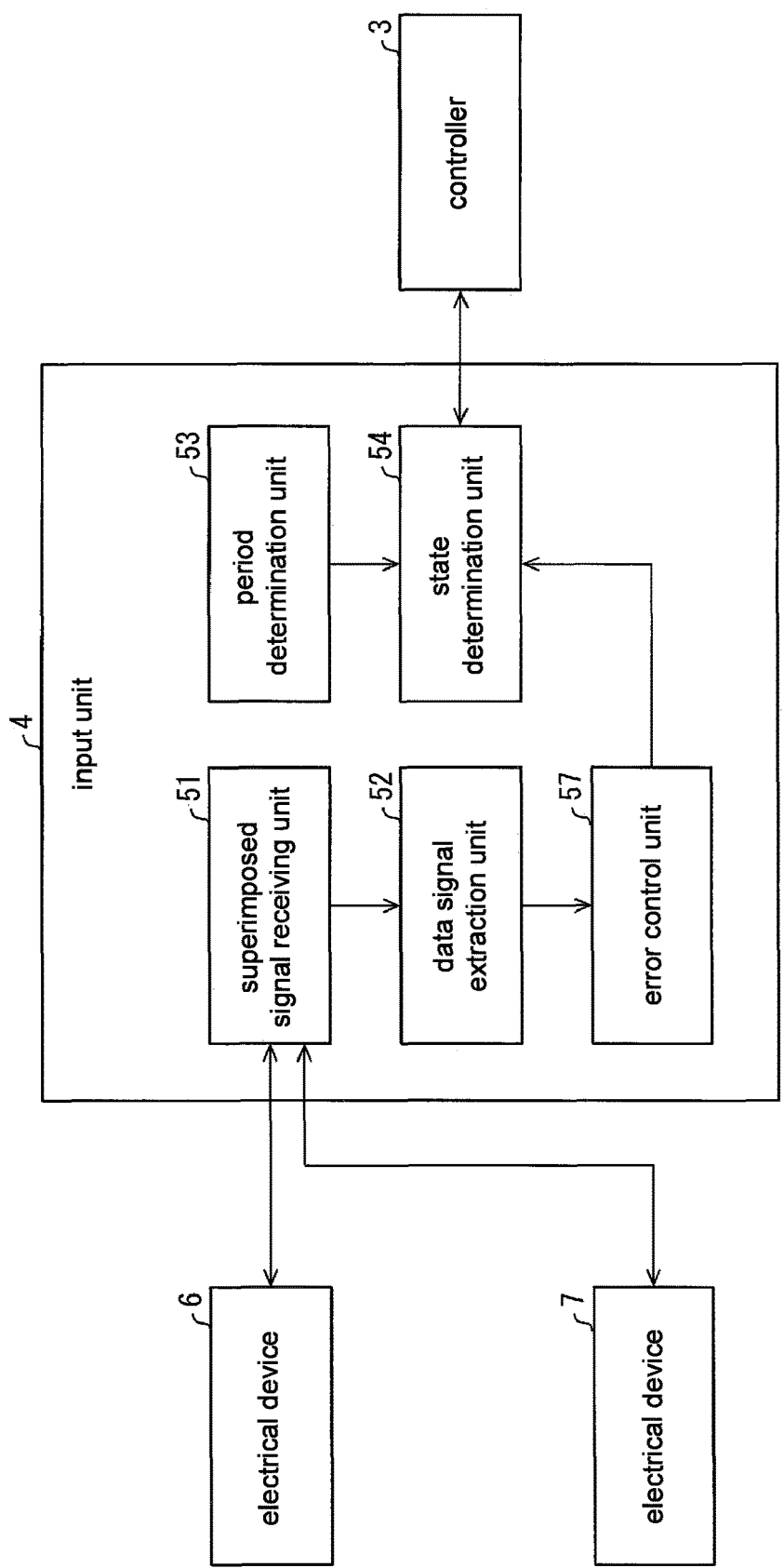
FIG. 10 is a block diagram illustrating an outline of configurations of main parts in a communication device according to an embodiment of the disclosure.

The output unit 5 includes a first output terminal 41, a second output terminal 42, a third output terminal 43, an output circuit 37, an amplitude setting circuit 38, an extraction circuit 34, an error detection circuit 35, and a unit control circuit 36. In FIG. 10, illustration of a configuration of a portion for transmission to the controller 3 is omitted. The potential of the third output terminal 43 is constantly maintained (for example, GND). The control signal is output from the second output terminal 42 to the signal line 22. The potential of the first output terminal 41 is maintained at a predetermined potential (24 V) by the power source 20.

The unit control circuit 36 corresponds to the period determination unit 53 and the state determination unit 54 in FIG. 1 and outputs signals (ON/OFF signals) related to control of the electrical device 8 to the output circuit 37 on the basis of instructions from the PC 2 and the controller 3. In addition, the unit control circuit 36 outputs a data signal to the controller 3. The output circuit 37 generates a control signal for controlling the electrical device 8 on the basis of the signal received from the unit control circuit 36 and outputs the control signal to the amplitude setting circuit 38. The amplitude setting circuit 38 corresponds to the superimposed signal receiving unit 51 in FIG. 1 and sets the amplitude of the control signal by changing the potential to be output to the second output terminal 42 in accordance with H/L of the control signal. The extraction circuit 34 corresponds to the data signal extraction unit 52 in FIG. 1, extracts the data signal from the superimposed signal, and outputs the data signal to the error detection circuit 35.

(Operations of Electrical Device 6 and Input Unit 4 in Communication Using Superimposed Signal)

Figure 5:
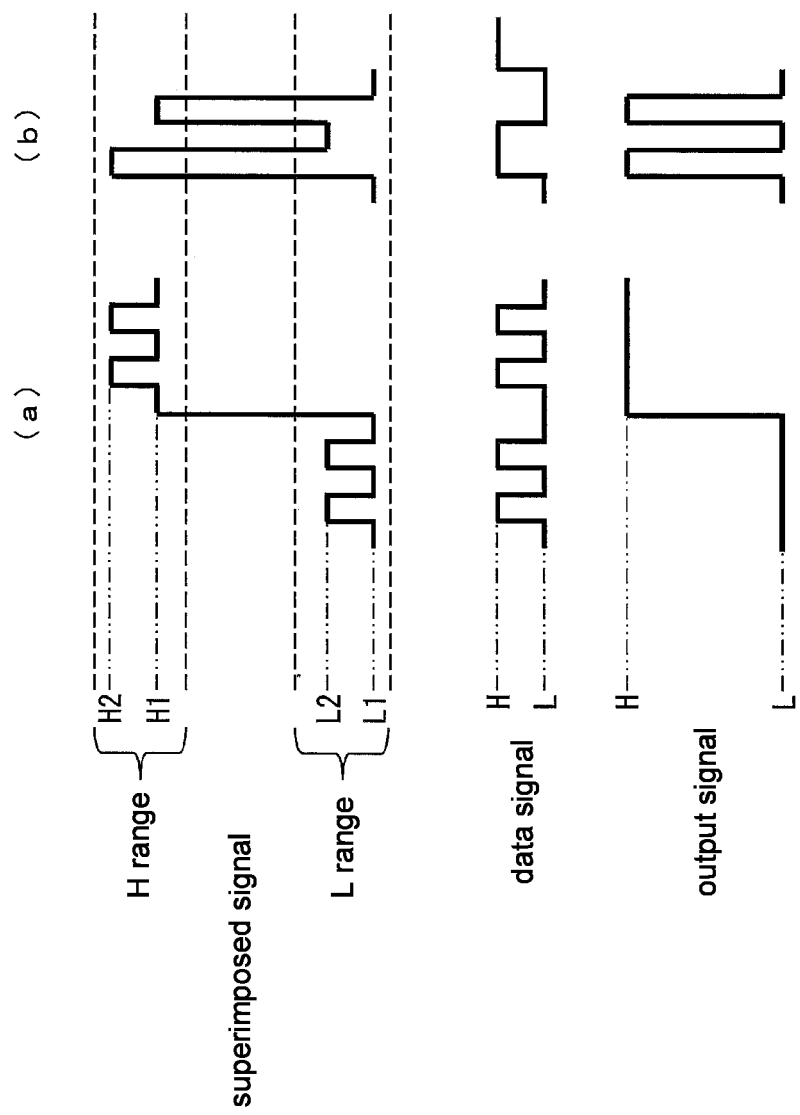
FIG. 5 is a diagram schematically illustrating an example of a signal waveform.

An example of operations of the electrical device 6 and the input unit 4 will be described with reference to FIG. 5 for operations of electrical devices and the communication device in communication using superimposed signals according to an embodiment of the disclosure. Note that FIG. 5 can similarly describe the combination between the electrical device 7 and the input unit 4 and the combination between any of the electrical devices 8 to 10 and the output unit 5. FIG. 5 is a diagram schematically illustrating an example of a signal waveform. (a) in FIG. 5 illustrates a case in which a cycle of an output signal (operation signal) is longer than a cycle of a data signal, and (b) illustrates a case in which the cycle of the output signal is shorter than the cycle of the data signal. A signal obtained by superimposing the output signal and the data signal is the superimposed signal. The waveform of the superimposed signal is a waveform obtained by superimposing the waveform of the output signal and the waveform of the data signal. The amplitude of the output signal is greater than the amplitude of the data signal. Therefore, it is possible to ascertain the value of the original output signal and the value of the data signal from the superimposed signal. Here, the output signal becomes H in a case in which the switch of the electrical device 6 is ON, and the output signal becomes L in a case in which the switch of the electrical device 6 is OFF.

The value of the superimposed signal is divided into L1, L2, H1, and H2 in ascending order. If the superimposed signal is within an L range, the output signal is L. The L range includes L1 and L2. If the superimposed signal is within an H range that is higher than the L range, the output signal is H. The H range includes H1 and H2. In a case in which the superimposed signal is L1 or H1, the data signal is L. In a case in which the superimposed signal is L2 or H2, the data signal is H.

If the superimposed signal receiving unit 51 receives the superimposed signal from the electrical device 6, then the input unit 4 determines whether the output signal is H or L (whether the switch of the electrical device 6 is ON or OFF) from the superimposed signal. The data signal extraction unit 52 extracts the data signal from the superimposed signal and outputs the data signal. Then, the input unit 4 can output information in accordance with the data signal to the outside.

In this manner, the input unit 4 can determine whether the switch of the electrical device 6 is ON or OFF and further execute processing in accordance with the data signal on the basis of the superimposed signal.

In addition, the input unit 4 can output the identifier and the position information of the electrical device 6 to the outside along with information indicating disconnection of a wiring and the like. The PC 2 can notify a state of the communication between the input unit 4 and the electrical device 6 to the user, according to three classifications of normal, warning, or malfunction, for example, in accordance with the information received from the input unit 4 via the controller 3. The user can determine whether or not to perform maintenance on the electrical device 6 by acquiring the information related to the state of the communication between the input unit 4 and the electrical device 6 by using the PC 2.

(Proportion of Transition Period with Respect to ON/OFF Cycle of Switch)

Figure 6:
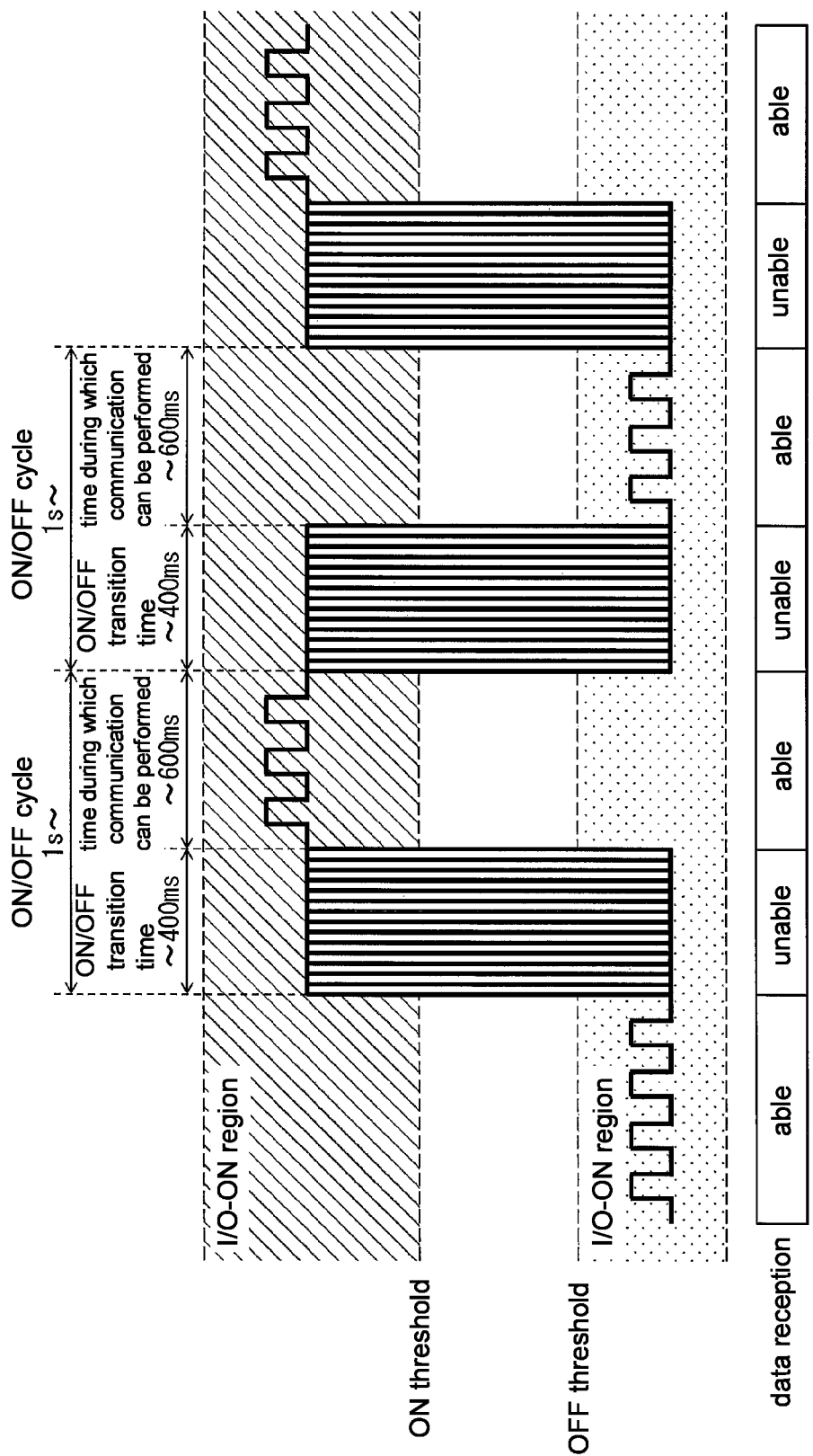
FIG. 6 is a schematic view illustrating a proportion of a transition period caused by switching of a switch.

Examples of an ON/OFF cycle and a proportion of a transition period with respect to the ON/OFF cycle of the switch in the electrical device 6 that performs communication with the input unit 4 by using the superimposed signal in an embodiment of the disclosure will be shown in FIG. 6. FIG. 6 is a schematic view illustrating the proportion of the transition period caused by switching the switch. Here, the ON/OFF cycle is a cycle in a case in which the electrical device 6 periodically switches the switch between ON and OFF. In the example illustrated in the drawing, the ON/OFF cycle is once per 1 s. Note that the combination between the electrical device 7 and the input unit 4 and the combination between any of the electrical devices 8 to 10 and the output unit 5 can be similarly described with reference to FIG. 6 except for that there are differences in how long the transition periods of the respective electrical devices are.

In the example illustrated in the drawing, the ON/OFF cycle of the electrical device 6 is equal to or greater than 1 s, and the transition period is equal to or less than 400 ms. Note that the length of the transition period differs depending on electric properties of the switch of the electrical device 6. In the example illustrated in the drawing, a communication error caused by occurrence of a large variation in the input and output voltage successively occurs in 400 ms at the maximum when the switch of the electrical device 6 is switched. In addition, this means that the input unit 4 can communicate with the data signal with no problem until switching of the next switch is started after the transition period due to the switching of the switch elapse, that is, in a period of equal to or less than 600 ms in the example illustrated in the drawing in the manner similar to that in the communication method in the related art. At this time, it is assumed that the communication of the data signal between the input unit 4 and the electrical device 6 is performed by using a communication frame with a communication speed of 10 kbps and a frame size of 48 byte. Since the communication cycle by such a communication frame is sufficiently smaller than the length of a time zone during which communication can be performed, the communication can be performed with no problem. If it is assumed that the communication cycle of the data signal between the input unit 4 and the electrical device 6 is 42 ms, for example, the input unit 4 can receive the data signal $600/42 \approx 14$ times in the time zone (600 ms) during which communication can be performed with the electrical device 6.

(Flow of Processing)

Figure 7:
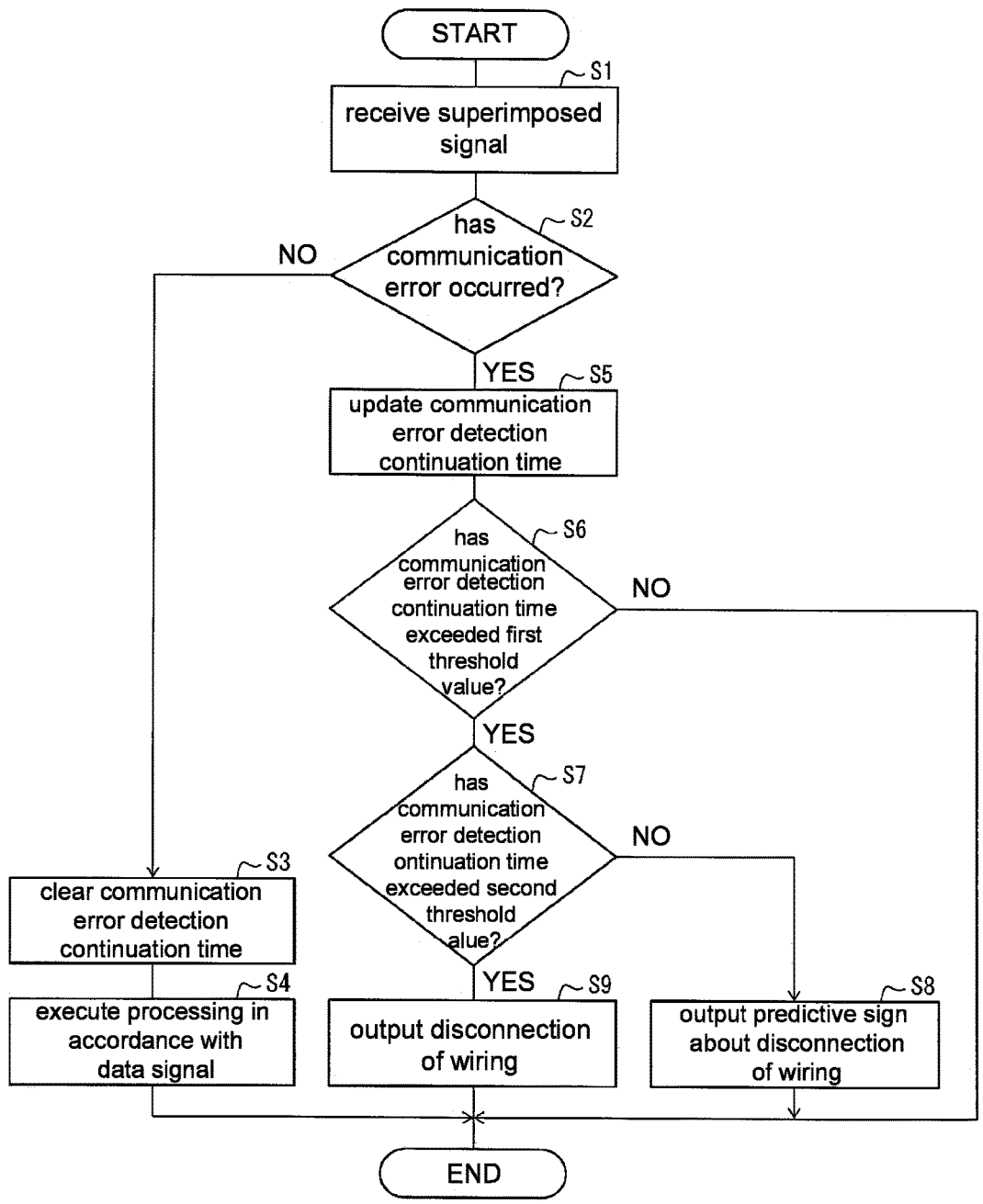
FIG. 7 is a flow diagram illustrating an example of processing that is executed by a communication device according to an embodiment of the disclosure.

A flow of processing that is executed by the input unit 4 according to an embodiment of the disclosure will be described below with reference to FIG. 7. FIG. 7 is a flow diagram illustrating an example of processing that is executed by the communication device according to an aspect of the disclosure. Note that FIG. 7 is similarly applied to the combination of the electrical devices 8 to 10 and the output unit 5.

First, the superimposed signal receiving unit 51 receives a superimposed signal from an electrical device connected to the input unit 4 (S1). Then, the superimposed signal receiving unit 51 determines whether or not a communication error has occurred in S1 (S2). In a case in which it is determined that no communication error has occurred (NO in S2), the superimposed signal receiving unit 51 determines that the communication has been performed normally. At this time, the input unit 4 clears a communication error detection continuation time by using the period determination unit 53 (S3) and executes processing in accordance with the data signal extracted from the superimposed signal received in S1 by using the data signal extraction unit 52 (S4). Thereafter, the series of processing is completed.

In a case in which it is determined that a communication error has occurred between the input unit 4 and the electrical device in S2 (YES in S2), the period determination unit 53 updates the communication error detection continuation time (S5), and further, determines whether or not the communication error detection continuation time after the update has exceeded the first predetermined threshold value (S6). In a case in which it is determined that the communication error detection continuation time has not exceeded the first predetermined threshold value (NO in S6), the period determination unit 53 regards the communication error detected in S2 as having occurred in the transition period of the electrical device. Then, the state determination unit 54 determines that no problem has occurred in the state of the communication between the input unit 4 and the electrical device. At this time, the input unit 4 completes the series of processing without performing specific processing on the basis of the communication error.

In a case in which it is determined that the communication error detection continuation time has exceeded the first predetermined threshold value in S6 (YES in S6), the state determination unit 54 further determines whether or not the communication error detection continuation time has exceeded the second threshold value (S7). In a case in which it is determined that the communication error detection continuation time has not exceeded the second threshold value (NO in S7), the state determination unit 54 determines that there is a possibility that a problem has occurred in the state of the communication between the input unit 4 and the electrical device. At this time, the input unit 4 outputs information indicating that a predictive sign of disconnection of a wiring has appeared between the input unit 4 and the electrical device to the controller 3 (S8) and then completes the series of processing.

In a case in which it is determined that the communication error detection continuation time has exceeded the second threshold value in S7 (YES in S7), the state determination unit 54 determines that a problem has occurred in the state of the communication between the input unit 4 and the electrical device. At this time, the input unit 4 outputs the information indicating that the wiring has been disconnected between the input unit 4 and the electrical device to the outside (S9) and then completes the series of processing.

Note that the input unit 4 waits for reception of the next signal immediately after completing reception of the superimposed signals from the electrical devices 6 and 7. Since the input unit 4 periodically receives the data signals from the electrical devices 6 and 7 in the embodiment, the series of processing is executed at every reception cycle of the data signal.

In the aforementioned processing, the input unit 4 according to the embodiment can perform communication with the electrical devices by using the superimposed signals and also determine the states of communication between the input unit 4 itself and the electrical devices in accordance with the continuation time during which the communication error is detected. Therefore, an effect that it is possible to provide a highly convenient communication device capable of detecting a communication error caused by an abnormality of communication in the communication device that communicates with the electrical devices by using the superimposed signals is achieved.

Note that the input unit 4 can ascertain ports that are used for connection with the electrical devices that are connected to the input unit 4 itself. Therefore, the input unit 4 may further output information related to the ports used for the connection with the electrical devices corresponding to the information along with the information indicating disconnection of a wiring or a predictive sign of disconnection of a wiring in the aforementioned processing.

Second Embodiment

Figure 8:
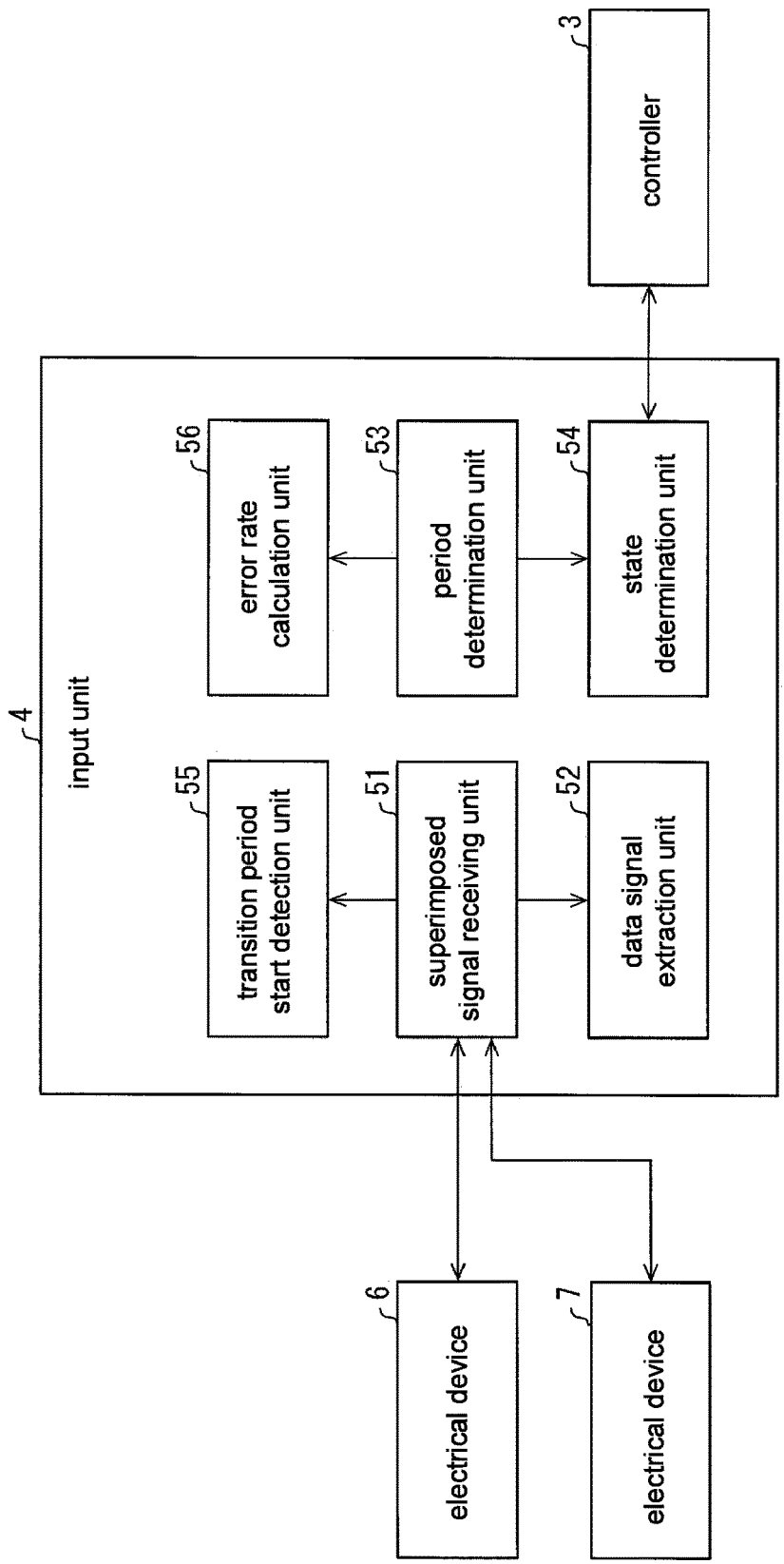
FIG. 8 is a block diagram illustrating an outline of configurations of main parts in a communication device according to an embodiment of the disclosure.
Figure 9:
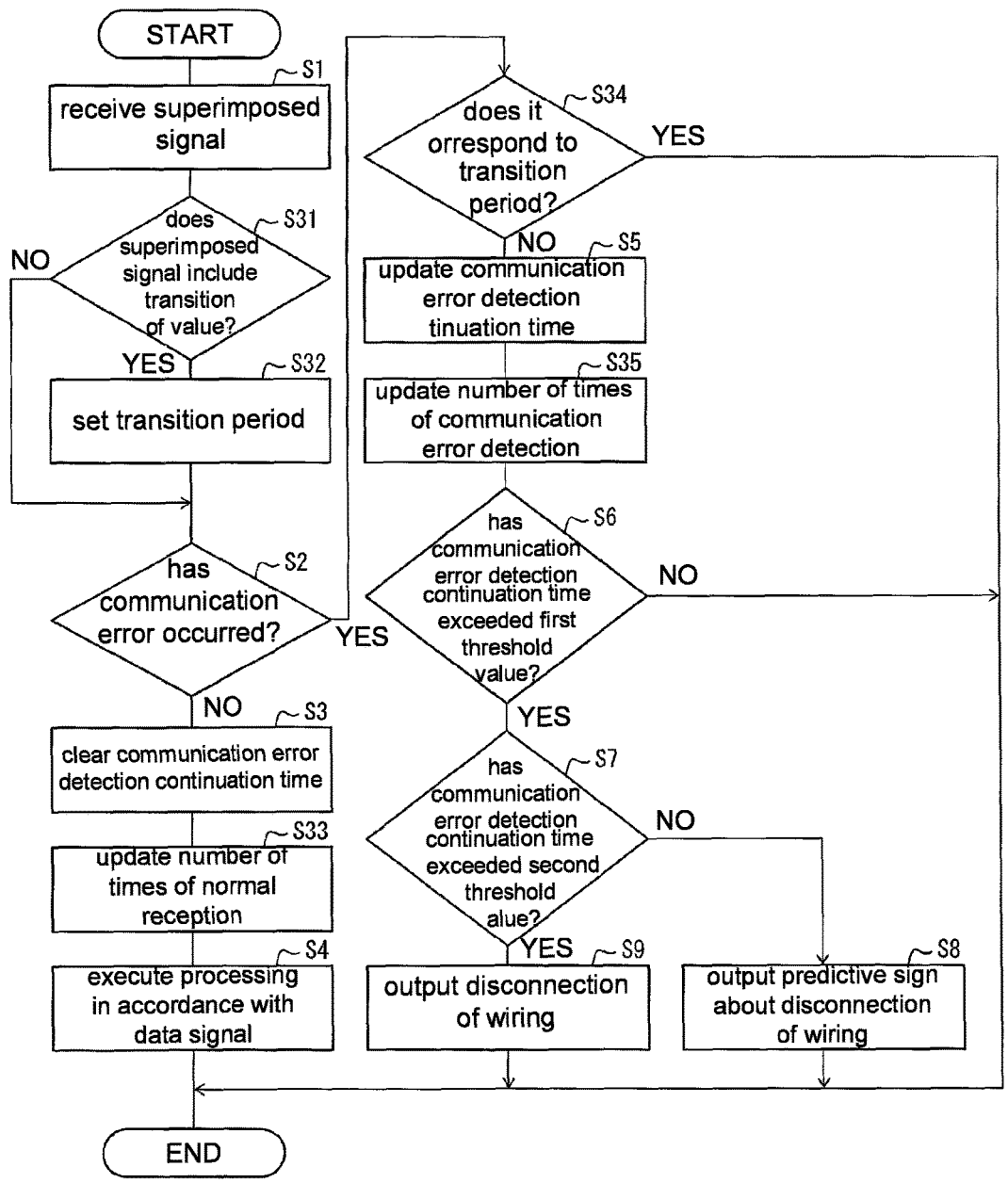
FIG. 9 is a flow diagram illustrating an example of processing that is executed by a communication device according to an embodiment of the disclosure.

A second embodiment of the invention will be described below with reference to FIGS. 5, 8, and 9. Note that the same reference numerals will be given to members with the same functions as those of the members described in the aforementioned first embodiment and the description thereof will be omitted for the purpose of convenience for description. Note that the input unit 4 and the output unit 5 correspond to the communication device in a manner similar to that in the first embodiment.

(Configuration of Input Unit)

A configuration of the input unit 4 that is the communication device according to the embodiment will be described with reference to FIG. 8. FIG. 8 is a block diagram illustrating an example of configurations of main parts in the input unit 4.

Although the input unit 4 has a basic configuration that is the same as that in the first embodiment, a part of the configuration is different. In the embodiment, the input unit 4 further includes a transition period start detection unit 55 and an error rate calculation unit 56 in addition to the configuration according to the first embodiment. The input unit 4 can set the transition period on the basis of a start timing of the transition period detected by the transition period start detection unit 55 and determine whether or not the communication error is able to be regarded as having occurred in the transition period. The input unit 4 can calculate occurrence probability of the communication error in a period as a target, which has been determined to be a period other than the transition period by the period determination unit 53, by using the error rate calculation unit 56.

If the transition period start detection unit 55 detects a start of transition of a superimposed signal of an electrical device, the period determination unit 53 regards a predetermined period from the start of the transition as a transition period and determines whether or not the communication error detected by the superimposed signal receiving unit 51 is able to be regarded as having occurred in the transition period. Note that the predetermined period may be set in any way. For example, the predetermined period may be manually set by the user or may be automatically acquired and set by the electrical device or the outside by communication.

The state determination unit 54 can determine that no problem has occurred in the state of the communication between the input unit 4 and the electrical device when the period determination unit 53 regards the communication error detected by the superimposed signal receiving unit 51 as having occurred in the transition period. In addition, the state determination unit may determine the state of the communication between the input unit 4 and the electrical device in accordance with the continuation time during which the communication error is successively detected (communication error detection continuation time) or the number of times of detection when the period determination unit 53 regards the communication error as having occurred in a period other than the transition period.

The transition period start detection unit 55 detects the start of the transition period of the electrical device. Specific description will be given with reference to FIG. 5. The transition period start detection unit 55 can detect rising of transition of the value of the output signal (operation signal) from L to H. In addition, the transition period start detection unit 55 can also detect falling of transition of the output signal from H to L. The transition period start detection unit 55 can transmit the detected start timing of the transition to the period determination unit 53.

The error rate calculation unit 56 can calculate the occurrence probability of the communication error detected by the superimposed signal receiving unit 51 in the period other than the transition period. The occurrence probability of the communication error may be a proportion of a communication error occurrence time with respect to the entire period other than the transition period or may be a proportion of the number of times the communication error has occurred with respect to the number of times the communication is performed during the period other than the transition period. The error rate calculation unit 56 may output the calculated occurrence probability of the communication error separately from the result of determining the state of the communication between the input unit 4 and the electrical device 6 to the outside.

(Determination of State of Communication)

The determination of the state of the communication between the input unit 4 and the electrical device 6, which is executed by the state determination unit 54, in an embodiment of the disclosure is similar to that in the first embodiment except for that the transition period is set in accordance with the start timing detected by the transition period start detection unit 55. That is, the determination of the communication state according to the embodiment can be applied to the combination between the input unit 4 and the electrical device 7 and can also be applied to the combination between the output unit 5 and any of the electrical devices 8 to 10.

(Content of Determination Result)

The content of the result of determining the state of the communication between the input unit 4 and the electrical device 6, which is output by the state determination unit 54 to the outside, in an embodiment of the disclosure is the same as that in the first embodiment.

(Configuration of Communication System)

The configuration of the communication system 1 according to the embodiment is the same as that in the first embodiment.

In the embodiment, the output unit 5 includes a configuration similar to that of the input unit 4. That is, the output unit 5 further includes a transition period start detection unit 55 and an error rate calculation unit 56 in addition to the configuration in the first embodiment. If the transition period start detection unit 55 detects the start of the transition of the value of the operation signal, the output unit 5 can set the transition period and determine the state of the communication between the output unit 5 itself and the electrical device by using the period determination unit 53 and the state determination unit 54 in the same manner as the input unit 4. In addition, the output unit 5 can calculate the occurrence probability of the communication error by using the error rate calculation unit 56 in the period as the target, which has been determined to be the period other than the transition period by the period determination unit 53.

(Flow of Processing)

A flow of processing that is executed by the input unit 4 according to an embodiment of the disclosure will be described below with reference to FIG. 9. FIG. 9 is a flow diagram illustrating an example of processing that is executed by the communication device according to an embodiment of the disclosure. Note that the input unit 4 and the output unit 5 correspond to the communication device in a manner similar to that in the first embodiment. FIG. 9 can be similarly applied to the combination between the electrical device 7 and the input unit 4 and the combination between any of the electrical devices 8 to 10 and the output unit 5.

Processing in S1 is the same as that in the first embodiment. After S1, the transition period start detection unit 55 determines whether or not there is a change (from L to H or from H to L) in the value of the output signal (operation signal) included in the superimposed signal received in S1 (S31). In a case in which it is determined that there is a change in the value of the output signal (YES in S31), the period determination unit 53 regards the timing at which there is a change in the output signal in S1 as a start timing of the transition period and sets a predetermined period from the start timing to be the transition period (S32), and the processing proceeds to S2. Meanwhile, in a case in which it is determined that there is no change in the value of the output signal in S31 (NO in S31), the processing directly proceeds to S2.

Processing in S2 is the same as that in the first embodiment. In a case in which it is determined that no communication error has occurred in S2 (NO in S2), the state determination unit 54 determines that no problem has occurred in the state of the communication between the input unit 4 and the electrical device. At this time, the input unit 4 clears the communication error detection continuation time by using the period determination unit 53 (S3) and then updates the number of times that the reception has been performed normally by using the error rate calculation unit 56 (S33). Thereafter, processing in accordance with the data signal extracted from the superimposed signal received in S1 by using the data signal extraction unit 52 is executed (S4). Thereafter, the series of processing is completed.

In a case in which it is determined that the communication error has occurred in S2 (YES in S2), the period determination unit 53 determines whether or not a current time corresponds to the transition period (S34). In a case in which it is determined that the current time does not correspond to the transition period (NO in S34), the input unit 4 updates the communication error detection continuation time by using the period determination unit 53 (S5) then updates the number of times that the communication error has been detected by using the error rate calculation unit 56 (S35). Thereafter, the state determination unit 54 determines whether or not the communication error detection continuation time after being updated in S5 has exceeded the first predetermined threshold value (S6). Processing in S6 to S9 is the same as that in the first embodiment.

In a case in which it is determined that the current time corresponds to the transition period in S34 (YES in S34), the state determination unit 54 determines that the communication is not the target for which the occurrence probability of the communication error is to be calculated. At this time, the input unit 4 completes the series of processing without performing specific processing.

Note that the input unit 4 waits for reception of the next signal immediately after the input unit 4 completes the reception of the superimposed signals from the electrical devices 6 and 7. Since the input unit 4 periodically receives the data signals from the electrical devices 6 and 7 in the embodiment, the series of processing is executed at every reception cycle of the data signal.

In addition, the input unit 4 may calculate an error rate during the communication on the basis of the number of times that the data signal has been received normally and the number of times that the communication error of the data signal has been detected, which are counted in a predetermined calculation period, for example. The error rate can be defined as "the counted number of times that the communication error has been detected/(the number of times that the data signal has been received normally+the number of times that the communication error has been detected)", for example. Note that it is preferable to clear each of the number of times that the data signal has been performed normally and the number of times that the communication error of the data signal has been detected after elapse of the predetermined calculation period. The calculation period may be set in any way as long as the configuration thereof is suitable for evaluating the error rate. For example, the calculation period may be set for each time zone or may be set at a specific elapse time after activation of the input unit 4.

The input unit 4 according to an embodiment of the disclosure can set a period that is regarded as the transition period in accordance with a timing at which the transition of the value of the operation signal has actually been detected. In this manner, it is possible to more accurately distinguish whether or not the communication error is able to be regarded as having occurred in the transition period. In addition, the input unit 4 can determine the state of the communication with the electrical device in accordance with the continuation time of the communication error that has occurred in the period other than the transition period or the number of times the communication error has been detected.

Third Embodiment

Figure 11:
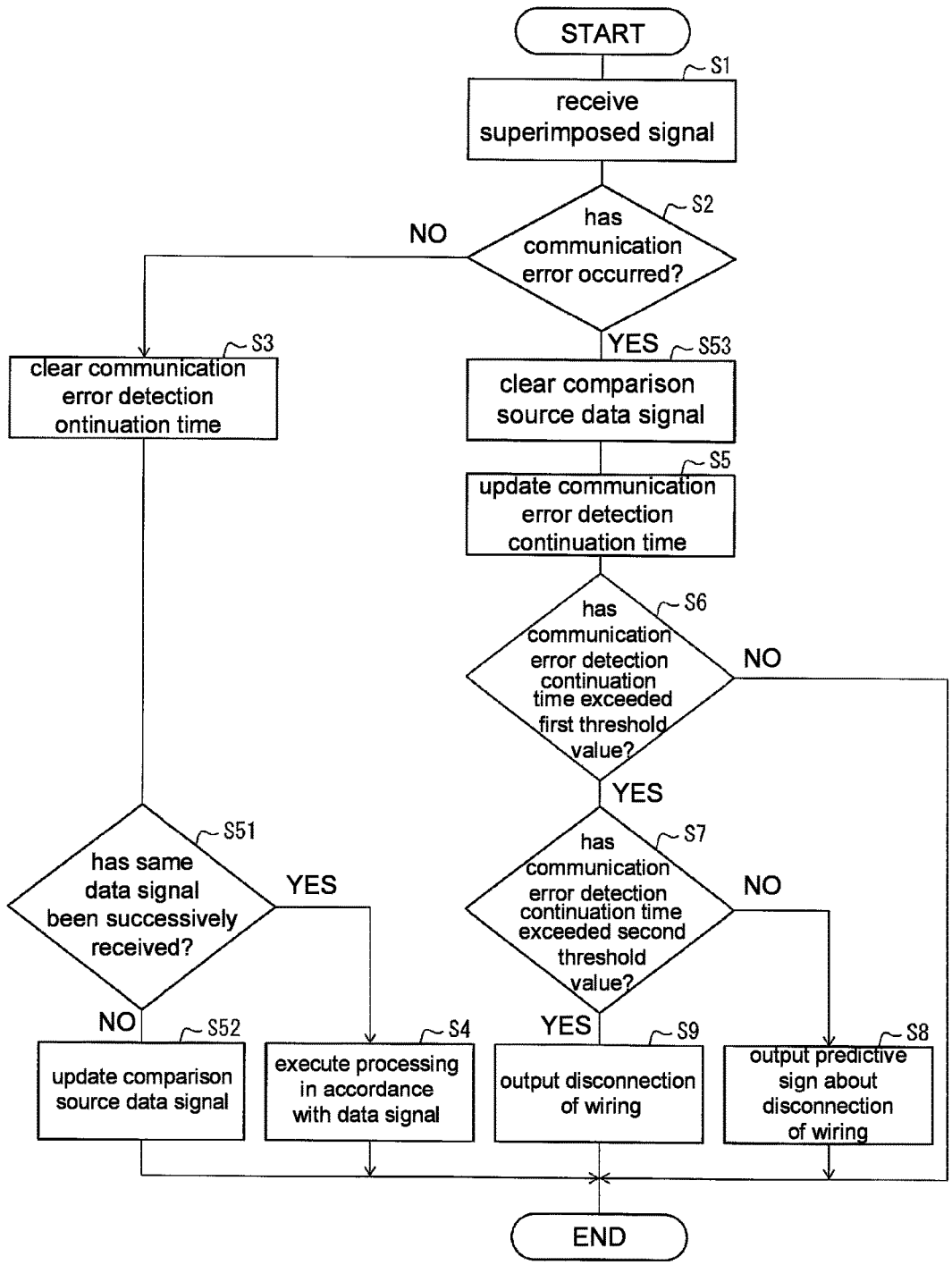
FIG. 11 is a flow diagram illustrating an example of processing that is executed by a communication device according to an embodiment of the disclosure.

A third embodiment of the invention will be described below with reference to FIGS. 10 and 11. Note that the same reference numerals will be given to members that have the same functions as those of the members described in the aforementioned embodiments and description thereof will be omitted for the purpose of convenience for description. The input unit 4 and the output unit 5 correspond to the communication device in a manner similar to that in the respective embodiments.

(Configuration of Input Unit)

A configuration of the input unit 4 that is the communication device according to the embodiment will be described with reference to FIG. 10. FIG. 10 is a block diagram illustrating an example of configurations of main parts in the input unit 4.

Although the input unit 4 has a basically same configuration as that in the first embodiment, a part of the configuration is different. In the embodiment, the input unit 4 further includes an error control unit 57 in addition to the configuration according to the first embodiment. The input unit 4 can perform the processing in accordance with the data signals only in a case in which the same data signals can be successively received from the electrical devices 6 and 7. The input unit 4 performs the processing in accordance with the data signals only in a case in which the same data signals can be successively received twice, for example.

The error control unit 57 can determine that the data signal is the normally received data signal in a case in which the data signals successively received a plurality of times coincides. More specifically, the error control unit 57 can determine whether or not the data signal extracted by the data signal extraction unit 52 from the superimposed signal received by the superimposed signal receiving unit 51 is the same as a comparison source data signal that is received immediately before the data signal and transmit the determination result to the state determination unit 54.

Here, it is determined whether or not the same data signals have been successively received twice for the following reason. First of all, the frame is easily damaged by influences of variations in input and output voltages in the electrical devices 6 and 7 in the communication when the electrical devices 6 and 7 are in the transition period. However, it is considered that the data signals have been received normally when the same data signals can be successively received twice even in the aforementioned situation. Accordingly, there is no problem that the processing in accordance with the data signals is executed when the electrical devices 6 and 7 are in the transition period, in a case in which the same data signals are successively received twice. This is because it is possible to reduce an error missing rate by successively receiving the same data signals normally in addition to error control that is performed by communication using a general filed bus, such as a cyclic redundancy check (CRC).

Note that the error control unit 57 has any configuration as long as it is possible to check identity of the two data signals with the configuration. For example, the identity of the two data signals may be checked by using data signal after correction, after code check and frame check using an error control code are performed on the data signal and the error of the data signal is corrected.

(Determination of State of Communication)

A difference in the determination of the state of the communication between the input unit 4 and the electrical device 6, which is executed by the state determination unit 54, according to an embodiment of the disclosure from that in the first embodiment will be described. Note that the determination of the state of the communication according to the embodiment can be applied to the combination between the input unit 4 and the electrical device 7 and can also be applied to the combination between the output unit 5 and any of the electrical devices 8 to 10.

The state determination unit 54 determines that no problem has occurred in the state of the communication between the input unit 4 and the electrical device 6 when the determination result received from the period determination unit 53 indicates that the communication error detected by the superimposed signal receiving unit 51 is regarded as having occurred in the transition period of the electrical device 6. Further, the state determination unit 54 determines that the content of the data signal extracted from the superimposed signal by the data signal extraction unit 52 is appropriate and that the processing may be executed by using the data signal when the same content is successively extracted twice.

Meanwhile, the state determination unit 54 determines that the data signal has been accidentally received normally and the content is not appropriate when the content of the data signals extracted twice successively from superimposed signals by the data signal extraction unit 52 are not the same. At this time, the input unit 4 does not perform processing on the extracted data signals.

With the aforementioned configuration, the state determination unit 54 performs the processing in accordance with the data signals received with appropriate content in the transition period and determines the state of the electrical device 6 on the basis of whether or not the same data signals have been successively received.

(Content of Determination Result)

Content of the result of determining the state of the electrical device 6, which is output by the state determination unit 54 to the controller 3, according to an embodiment of the disclosure is the same as that in the first embodiment and the second embodiment.

(Configuration of Communication System)

The configuration of the communication system 1 according to the embodiment is the same as that in the first embodiment.

In the embodiment, the output unit 5 has a configuration similar to that of the input unit 4. That is, the output unit 5 further includes the error control unit 57 in addition to the configuration in the respective embodiments. The output unit 5 can determine whether or not the respective data signals coincide with each other when the same data signals are successively received a plurality of times from the electrical devices 8 to 10 in a manner similar to that in the input unit 4.

(Flow of Processing)

A flow of processing that is executed by the input unit 4 according to an embodiment of the disclosure will be described below with reference to FIG. 11. FIG. 11 is a flow diagram illustrating an example of processing that is executed by the communication device according to an embodiment of the disclosure.

Processing in S1 and S2 is the same as that in the first embodiment. In a case in which no communication error has occurred in S2 (NO in S2), the period determination unit 53 clears the communication error detection continuation time (S3). Then, the state determination unit 54 extracts a data signal from a superimposed signal by using the data signal extraction unit 52 and further determines whether or not the same data signals have been successively received by using the error control unit 57 (S51). In a case in which it is determined that the same data signals have not been successively received (NO in S51), the state determination unit 54 determines that the communication has accidentally received normally. At this time, the state determination unit 54 updates the content of the comparison source data signal to the content received in S1 by using the error control unit 57 (S52). Thereafter, the input unit 4 completes the series of processing without performing specific processing.

In a case in which it is determined that the same data signals have been successively received in S51 (YES in S51), the state determination unit 54 determines that the communication has been performed normally. At this time, the input unit 4 executes the processing in accordance with the data signals (S4). Thereafter, the series of processing is completed.

In a case in which it is determined that the communication error has occurred in S2 (YES in S2), the state determination unit 54 clears the content of the comparison source data signal by using the error control unit 57 (S53). Thereafter, processing in S5 to S9 is executed in a manner similar to that in the first embodiment.

Note that the input unit 4 waits for reception of the next signal immediately after the input unit 4 completes reception of the superimposed signals from the electrical devices 6 and 7. Since the input unit 4 periodically receives the data signals from the electrical devices 6 and 7 in the embodiment, the series of processing is executed at every reception cycle of the data signals.

According to the aforementioned processing, the input unit 4 can process the data signals as data signals that have been received normally only in a case in which the successively received data signals are the same. In this manner, it is possible to determine the state of the communication with the electrical devices without using the data signals included in the superimposed signals of the electrical devices that have been accidentally received normally. In addition, it is possible to process the data signals as the data signals that have been received normally when the same data signals have been successively received a plurality of times during a period including the transition period.

Modification Examples

In the respective embodiments, the transition period is manually set by the user, a large value that is estimated to sufficiently include the time of the transition of the state is set in advance, and a value of a transition period of a product with the longest transition period in a product lineup including the electrical devices 6 and 7 is set. However, there is a concern that in the aforementioned setting, a burden is imparted on the user, and a larger value than the accurate time for the transition of the state is set due to a margin included in the estimated value, which makes it impossible to accurately determine disconnection and a predictive sign of disconnection of a wiring. Therefore, the input unit 4 may acquire identifiers of the electrical devices 6 and 7 when the communication system 1 is activated, for example, acquire the accurate time for the transition of the state linked with the identifiers from an external server, and set the time as the transition period. At this time, it is not necessary for the input unit 4 to communicate directly with the external server, and the input unit 4 may acquire the transition time via the PC 2, for example. In addition, there is no need to perform the communication with the external server if the PC 2 or the like provided in the communication system 1 retains the accurate time for the transition of the state linked with the identifiers in advance. Note that since the transition of the state based on switching of switches in the electrical devices 6 and 7 does not occur when the communication system 1 is activated, the identifiers can be acquired normally. Further, the electrical devices 6 and 7 may be configured to retain information related to the transition period related to the electrical devices 6 and 7 themselves along with the identifiers, and the input unit 4 may be configured to acquire the identifiers and the information when the communication system 1 is activated.

The transition period of the electrical devices 6 and 7 may be set on the basis of an actually measured value. For example, the switches of the electrical devices 6 and 7 perform switching immediately after the communication system 1 is activated, the actually measured value of the communication error detection continuation time is obtained by the state determination unit 54. Then, the transition period of the electrical devices 6 and 7 may be set on the basis of the acquired actually measured value of the communication error detection continuation time.

CONCLUSION

A communication device (an input unit 4 and an output unit 5) according to a first aspect of the disclosure is a communication device capable of mutually communicating with an electrical device (6 to 10), the communication device including: a superimposed signal receiving unit (51) that receives a data signal related to the electrical device as a signal superimposed on an operation signal output from the electrical device or an operation signal input to the electrical device; a period determination unit (53) that determines whether or not a communication error of the data signal detected by the superimposed signal receiving unit is able to be regarded as having occurred in a transition period of a value of the operation signal; and a state determination unit (54) that determines a state of communication with the electrical device in accordance with the determination by the period determination unit.

With the aforementioned configuration, the communication device that uses the superimposed signal can determine the state of the communication with the electrical device. In this manner, the user can distinguish an abnormality of a wiring from communication errors due to other reasons and take an appropriate measure in accordance with the state of the communication. Therefore, an effect that it is possible to provide a highly convenient communication device capable of detecting a communication error caused by an abnormality of a state of communication is achieved.

In the communication device (the input unit 4 and the output unit 5) according to a second aspect, the period determination unit (53) may determine whether or not the communication error is able to be regarded as having occurred in the transition period in accordance with a continuation time that the communication error is successively detected, in the first aspect.

With the aforementioned configuration, the communication device can distinguish the communication error derived from the transition period of the electrical device from permanent disconnection by using the continuation time of the communication error, for example.

In the communication device (the input unit 4 and the output unit 5) according to a third aspect of the disclosure, the period determination unit (53) may regard the communication error as having occurred in the transition period in a case in which the continuation time is within a first predetermined threshold value, and the state determination unit (54) may determine that no problem has occurred in the state of communication with the electrical device (6 to 10) in a case in which the period determination unit regards that the communication error as having occurred in the transition period, in the second aspect.

With the aforementioned configuration, the communication device can distinguish the communication error that has occurred in the transition period of the electrical device from communication errors due to other reasons in accordance with the continuation time of the communication error.

In the communication device (the input unit 4 and the output unit 5) according to a fourth aspect of the disclosure, the period determination unit (53) may regard the communication error as having occurred in a period other than the transition period in a case in which the continuation time is greater than the first threshold value, and the state determination unit (54) may determine that there is a possibility that a problem has occurred in the state of the communication with the electrical device (6 to 10) in a case in which the period determination unit regards the communication error as having occurred in a period other than the transition period, in the third aspect.

With the aforementioned configuration, the communication device determines that there is a possibility that the communication error is permanent when the continuation time of the communication error is greater than the first threshold value. At this time, the communication device can output the possibility that the problem has occurred in the state of the communication with the electrical device, for example, to the outside.

In the communication device (the input unit 4 and the output unit 5) according to a fifth aspect of the disclosure, the state determination unit (54) determines that a problem has occurred in the state of the communication with the electrical device (6 to 10) in a case in which the continuation time is greater than a second threshold value that is greater than the first threshold value, in the fourth aspect.

With the aforementioned configuration, the communication device determines that the communication error is permanent when the continuation time of the communication error is greater than the first threshold value and the second threshold value. At this time, the communication device can output the fact that the problem has occurred in the state of the communication with the electrical device, for example, to the outside. In addition, it is possible to predict a possibility of disconnection of a wiring at timing when the continuation time of the communication error exceeds the first threshold value and to thereby start preparation for the disconnection of the wiring at the timing at which the continuation time exceeds the first threshold value, for example, and to start a repair operation for the disconnection of the wiring immediately after the continuation time exceeds the second threshold value.

The communication device (the input unit 4 and the output unit 5) according to a sixth aspect of the disclosure may further include: a transition period start detection unit (55) that detects a start of the transition period, the period determination unit (53) may regard a predetermined period from the start of the transition period as the transition period and determines whether or not the communication error is able to be regarded as having occurred in the transition period, and the state determination unit (54) may determine that no problem has occurred in the state of the communication with the electrical device (6 to 10) in a case in which the period determination unit regards the communication error as having occurred in the transition period, in the first aspect.

With the aforementioned configuration, the communication device can set a period that is regarded as the transition period in accordance with the timing at which the transition of the value of the operation signal is actually detected. In this manner, it is possible to more accurately distinguish whether or not the communication error has occurred in the transition period.

In the communication device (the input unit 4 and the output unit 5) according to a seventh aspect of the disclosure, the state determination unit (54) may determine the state of the communication with the electrical device (6 to 10) in accordance with a continuation time or a number of times that the communication error is successively detected in a case in which the period determination unit (53) regards the communication error as having occurred in a period other than the transition period, in the sixth aspect.

With the aforementioned configuration, the communication device can determine whether or not the state of the communication with the electrical device is normal in accordance with the continuation time of the communication error that has occurred in the period other than the transition period and the number of times that the communication error has been detected.

The communication device (the input unit 4 and the output unit 5) according to an eighth aspect of the disclosure may further include: an error rate calculation unit (56) that calculates occurrence probability of the communication error in a period that is determined by the period determination unit (53) as the period other than the transition period, in the sixth or seventh aspect.

With the aforementioned configuration, the communication device can exclude the communication error derived from the transition period of the electrical device from a target of calculation of an error rate. In this manner, the error rate that accurately reflects the state of the communication with the electrical device can be calculated.

The communication device (the input unit 4 and the output unit 5) according to a ninth aspect of the disclosure may further include: an error control unit (57) that detects an error of the data signal, the superimposed signal receiving unit (51) may successively receive the same data signals a plurality of times from the electrical device (6 to 10), and the error control unit may determine that the data signals are normally received data signals in a case in which the data signals successively received the plurality of times coincide with each other, in any of the first to fifth aspects.

Since the frame is easily damaged by influences of variations in input and output voltages in the electrical device in the communication device that communicates with the electrical device by using the superimposed signal, an error missing rate increases for the communication device that performs communication by using a general field bus. Meanwhile, the data signals are processed as normally received data signals only in a case in which the successively received data signals are the same with the aforementioned configuration. In this manner, since the error is detected on the basis of whether or not the same data signals have been able to be successively received a plurality of times in addition to error control performed in the communication using the general field bus, it is possible to reduce the error missing rate.

A communication system (1) according to a tenth aspect of the disclosure includes: an electrical device (6 to 10); and a communication device (an input unit 4 and an output unit 5) that is capable of mutually communicating with the electrical device and receives a data signal related to the electrical device as a signal superimposed on an operation signal output from the electrical device or an operation signal input to the electrical device, a state of communication with the electrical device is determined in accordance with a result of determining whether or not a communication error of the data signal detected by the communication device is able to be regarded as having occurred in a transition period of a value of the operation signal.

The communication device that communicates with the electrical device by using the superimposed signal detects the communication error in accordance with the transition period of the electrical device regardless of actual presence of malfunction. Therefore, there is a problem that an error detection rate increases as compared with the communication device that uses the general field bus. Therefore, it is necessary to distinguish a communication error corresponding to the transition period of the electrical device from a communication error due to disconnection of a wiring, a communication error due to an influence of disturbance noise, or the like and to determine presence of actual malfunction from the communication error that has occurred in a period in which communication can be performed normally other than the transition period of the electrical device in the communication system that provides the aforementioned communication device.

In contrast, with the aforementioned configuration, the user can distinguish an abnormality of a wiring from communication errors due to other reasons and take an appropriate measure in accordance with the state of the communication in a manner similar to that in the first aspect. Accordingly, it is possible for the user to estimate a situation such as disturbance noise from the detected situation of the communication error and to appropriately perform maintenance of equipment and devices including the communication device.

[Example of Implementation by Software]

Control blocks (the period determination unit 53 and the state determination unit 54, in particular) of the input unit 4 and the output unit 5 may be implemented by a logical circuit (hardware) formed on an integrated circuit (IC chip) or the like or may be implemented by software by using a central processing unit (CPU).

In the latter case, the input unit 4 and the output unit 5 include a CPU that executes orders of a program that is software implementing the respective functions, a read only memory (ROM) or a storage device (these will be referred to as a "recording medium") in which the aforementioned program and various kinds of data are recorded in a computer-readable (or CPU-readable) manner, a random access memory (RAM) that develops the aforementioned program, and the like. In addition, the object of the disclosure is achieved by the computer reading the aforementioned program from the aforementioned recording medium and executing the program. As the aforementioned recording medium, a "non-transitory tangible medium" such as a tape, a disc, a card, a semiconductor memory, a programmable logic circuit, or the like can be used. In addition, the aforementioned program may be supplied to the aforementioned program via an arbitrary transmission medium (a communication network, a broadcasting wave, or the like) capable of transmitting the program. Note that an aspect of the disclosure can also be implemented in a form of data signals, in which the aforementioned program is realized by electronic transmission, which are incorporated in carrier waves.

The disclosure is not limited to the respective embodiments described above, various modifications can be made within the scope indicated by the claims, and an embodiment obtained by appropriately combining technical means respectively disclosed in different embodiments is also included in the technical scope of the disclosure.

What is claimed is:

1. A communication device configured to mutually communicating with an electrical device, the communication device comprising:
   a superimposed signal receiving circuit that receives a data signal related to the electrical device as a signal superimposed on an operation signal output from the electrical device or an operation signal input to the electrical device;
   a period determination circuit that determines whether or not a communication error of the data signal detected by the superimposed signal receiving circuit occurs in a transition period of a value of the operation signal; and
   a state determination circuit that determines a state of communication with the electrical device in accordance with the determination by the period determination circuit,
   wherein the period determination circuit determines whether or not the communication error occurs in the transition period in accordance with a continuation time that the communication error is successively detected,
   wherein the period determination circuit regards the communication error as having occurred in a period other than the transition period in a case in which the continuation time is greater than a first predetermined threshold value, and
   the state determination circuit determines that there is a possibility that a problem has occurred in the state of the communication with the electrical device in a case in which the period determination circuit regards the communication error as having occurred in a period other than the transition period,
   wherein the state determination circuit determines that a problem has occurred in the state of the communication with the electrical device in a case in which the continuation time is greater than a second threshold value that is greater than the first threshold value.

2. The communication device according to claim 1,
   wherein the period determination circuit regards the communication error as having occurred in the transition period in a case in which the continuation time is within the first threshold value, and
   the state determination circuit determines that no problem has occurred in the state of communication with the electrical device in a case in which the period determination circuit regards the communication error as having occurred in the transition period.

3. The communication device according to claim 1, further comprising:
an error control circuit that detects an error of the data signal,
wherein the superimposed signal receiving circuit successively receives the same data signals a plurality of times from the electrical device, and
the error control circuit determines that the data signals are normally received data signals in a case in which the data signals successively received the plurality of times coincide with each other.

4. The communication device according to claim 2, further comprising:
an error control circuit that detects an error of the data signal,
wherein the superimposed signal receiving circuit successively receives the same data signals a plurality of times from the electrical device, and
the error control circuit determines that the data signals are normally received data signals in a case in which the data signals successively received the plurality of times coincide with each other.

5. A communication system comprising:
an electrical device; and
a communication device configured to mutually communicating with the electrical device, wherein the communication device comprises:
a superimposed signal receiving circuit that receives a data signal related to the electrical device as a signal superimposed on an operation signal output from the electrical device or an operation signal input to the electrical device;
a period determination circuit that determines whether or not a communication error of the data signal detected by the superimposed signal receiving circuit occurs in a transition period of a value of the operation signal; and
a state determination circuit that determines a state of communication with the electrical device in accordance with the determination by the period determination circuit,
wherein the period determination circuit determines whether or not the communication error occurs in the transition period in accordance with a continuation time that the communication error is successively detected,
wherein the period determination circuit regards the communication error as having occurred in a period other than the transition period in a case in which the continuation time is greater than a first predetermined threshold value, and
the state determination circuit determines that there is a possibility that a problem has occurred in the state of the communication with the electrical device in a case in which the period determination circuit regards the communication error as having occurred in a period other than the transition period,
wherein the state determination circuit determines that a problem has occurred in the state of the communication with the electrical device in a case in which the continuation time is greater than a second threshold value that is greater than the first threshold value.

6. The communication system according to claim 5,
wherein the period determination circuit regards the communication error as having occurred in the transition period in a case in which the continuation time is within the first threshold value, and
the state determination circuit determines that no problem has occurred in the state of communication with the electrical device in a case in which the period determination circuit regards the communication error as having occurred in the transition period.

7. A communication device configured to mutually communicating with an electrical device, the communication device comprising:
a superimposed signal receiving circuit that receives a data signal related to the electrical device as a signal superimposed on an operation signal output from the electrical device or an operation signal input to the electrical device;
a period determination circuit that determines whether or not a communication error of the data signal detected by the superimposed signal receiving circuit occurs in a transition period of a value of the operation signal;
a state determination circuit that determines a state of communication with the electrical device in accordance with the determination by the period determination circuit; and
a transition period start detection circuit that detects a start of the transition period,
wherein the period determination circuit regards a predetermined period from the start of the transition period as the transition period and determines whether or not the communication error occurs in the transition period, and
the state determination circuit determines that no problem has occurred in the state of the communication with the electrical device in a case in which the period determination circuit regards the communication error as having occurred in the transition period,
wherein the state determination circuit determines the state of the communication with the electrical device in accordance with a continuation time or a number of times that the communication error is successively detected in a case in which the period determination circuit regards the communication error as having occurred in a period other than the transition period.

8. The communication device according to claim 7, further comprising:
an error rate calculation circuit that calculates occurrence probability of the communication error in a period that is determined by the period determination circuit as the period other than the transition period.

* * * * *